United States Patent
Haga et al.

(10) Patent No.: US 8,453,206 B2
(45) Date of Patent: May 28, 2013

(54) DETECTING UNAUTHORIZED TAMPERING OF A PROGRAM

(75) Inventors: Tomoyuki Haga, Nara (JP); Hideki Matsushima, Osaka (JP); Takayuki Ito, Osaka (JP); Manabu Maeda, Osaka (JP); Taichi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 1144 days.

(21) Appl. No.: 12/377,040

(22) PCT Filed: Nov. 7, 2007

(86) PCT No.: PCT/JP2007/071638
§ 371 (c)(1),
(2), (4) Date: Feb. 10, 2009

(87) PCT Pub. No.: WO2008/056700
PCT Pub. Date: May 15, 2008

(65) Prior Publication Data
US 2010/0162352 A1    Jun. 24, 2010

(30) Foreign Application Priority Data
Nov. 9, 2006    (JP) .................................. 2006-304197

(51) Int. Cl.
*G06F 7/04*    (2006.01)
(52) U.S. Cl.
USPC ............................................. 726/2; 713/187
(58) Field of Classification Search
USPC .......................................................... 726/2
See application file for complete search history.

(56) References Cited

U.S. PATENT DOCUMENTS

| | | | |
|---|---|---|---|
| 4,786,790 A | 11/1988 | Kruse et al. | |
| 5,475,826 A | 12/1995 | Fischer | |
| 5,694,569 A | 12/1997 | Fischer | |
| 6,026,293 A | 2/2000 | Osborn | |

(Continued)

FOREIGN PATENT DOCUMENTS

| | | |
|---|---|---|
| JP | 63-229541 | 9/1988 |
| JP | 10-254840 | 9/1998 |

(Continued)

OTHER PUBLICATIONS

Supplementary European Search Report dated Feb. 21, 2011 in corresponding European Patent Application No. 07831369.9.

(Continued)

*Primary Examiner* — Amare F Tabor
(74) *Attorney, Agent, or Firm* — Wenderoth, Lind & Ponack, L.L.P.

(57) ABSTRACT

A tamper detection device detects tampering with a program loaded to memory, at high speed and without compromising the safety. Prior to loading of a program, a dividing-size determining unit 12 determines a block size based on random number information, a dividing unit 13 divides the program by the block size into data blocks, and a first conversion unit 14 converts, by conducting a logical operation, the data blocks into intermediate authentication data no greater than the block size, and a second conversion unit 15 conducts a second conversion on the intermediate authentication data to generate authentication data. The authentication data and the block size are stored. After the program loading, a program resulting from the loading is divided by the block size, followed by the first and second conversions to generate comparative data. The comparative data is compared with the authentication data to detect tampering of the loaded program.

23 Claims, 16 Drawing Sheets

U.S. PATENT DOCUMENTS

| | | | |
|---|---|---|---|
| 6,178,509 B1 | 1/2001 | Nardone et al. | |
| 7,287,166 B1 * | 10/2007 | Chang et al. | 713/187 |
| 7,328,453 B2 * | 2/2008 | Merkle et al. | 726/23 |
| 7,616,766 B2 * | 11/2009 | Ogihara et al. | 380/286 |
| 7,734,926 B2 * | 6/2010 | Morais | 713/181 |
| 7,739,579 B2 * | 6/2010 | Kameyama et al. | 714/769 |
| 2002/0053024 A1 | 5/2002 | Hashimoto et al. | |
| 2003/0098775 A1 | 5/2003 | Hazard | |
| 2003/0188231 A1 | 10/2003 | Cronce | |
| 2005/0015599 A1 | 1/2005 | Wang et al. | |
| 2005/0066169 A1 | 3/2005 | Kiehtreiber et al. | |
| 2006/0026442 A1 | 2/2006 | Ittogi | |
| 2006/0161761 A1 | 7/2006 | Schwartz et al. | |
| 2006/0288223 A1 | 12/2006 | Kiehtreiber et al. | |
| 2006/0288230 A1 | 12/2006 | Crall et al. | |

FOREIGN PATENT DOCUMENTS

| | | |
|---|---|---|
| JP | 2002-140126 | 5/2002 |
| JP | 2003-302900 | 10/2003 |
| JP | 2003-533788 | 11/2003 |
| JP | 2004-184516 | 7/2004 |
| JP | 2005-173903 | 6/2005 |
| JP | 2006-39206 | 2/2006 |
| JP | 2006-53787 | 2/2006 |
| JP | 2006-154997 | 6/2006 |
| JP | 2006-202270 | 8/2006 |
| WO | 2004/114045 | 12/2004 |
| WO | 2005/029223 | 3/2005 |

OTHER PUBLICATIONS

International Search Report issued Jan. 29, 2008 in the International (PCT) Application of which the present application is the U.S. National Stage.

* cited by examiner

FIG. 2

Authentication Data List 23

| Program Identifier 41 | Program Address (Starting Address of RAM) 42 | Program Size 43 | Block Size 44 | Authentication Data (Second Authentication Data) 45 |
|---|---|---|---|---|
| 0001 | 0x10000 | 62KB | 4KB | Authentication Data A1 |
| 0002 | 0x41000 | 123KB | 5KB | Authentication Data A2 |
| 0003 | 0x7F000 | 300KB | | |

Authentication Data List — 81

| Program Identifier 82 | Program Address 83 | Program Size 84 | Block Size 85 | Authentication Data 86 |
|---|---|---|---|---|
| 0001 | 0x10000 | 62KB | 1KB | Authentication Data_1 |
| 0001 | 0x10000 | 62KB | 4KB | Authentication Data_2 |
| 0001 | 0x10000 | 62KB | 6KB | Authentication Data_3 |
| 0001 | 0x10000 | 62KB | 20KB | Authentication Data_4 |

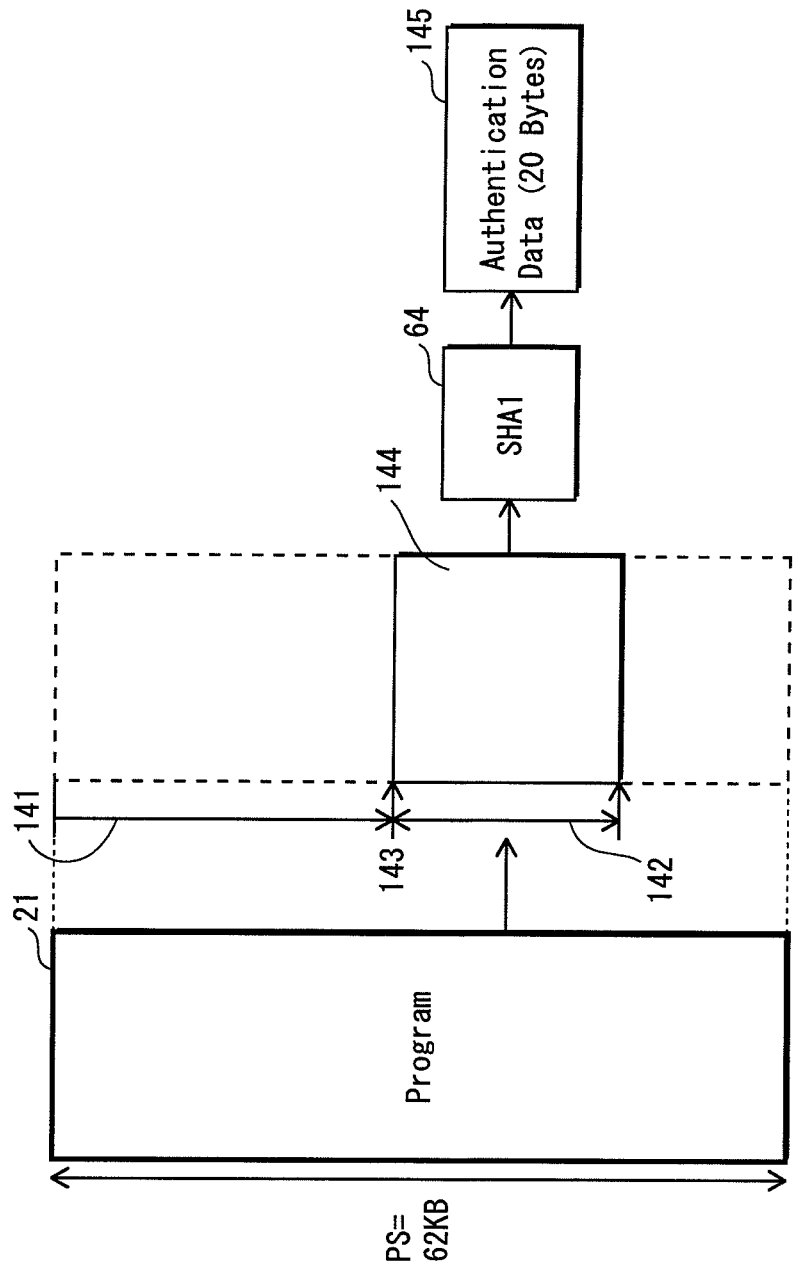

— 1 —
DETECTING UNAUTHORIZED TAMPERING OF A PROGRAM

TECHNICAL FIELD

The present invention relates to a technique of detecting unauthorized tampering of a program.

BACKGROUND ART

In recent years, various techniques for detecting tampering with a program have been developed. A typical example of such a technique is disclosed in Patent Document 1 listed below.

According to Patent Document 1, tampering with a target program is detected by comparing authentication data generated by applying a one-way hash function to the target program, with comparative data generated by applying the hash function to a program known to be authentic. Unfortunately, however, the process of generating a hash value of the entire program requires a great deal of time. For this disadvantage, in the case where such a tamper detection process is performed in parallel with execution of another program, a problem may be caused in execution of the other program.

Patent Document 2 discloses a technique of verifying the authenticity of a program without the use of a hash value. Instead of using a hash value, the authenticity is verified based on whether the program satisfies a predetermined condition at run time. Specifically, it is judged, as the predetermined condition, whether or not the return address of the program is within a predetermined address space, the execution mode is correct, or the processing completes within a predetermined time period. Failing to satisfy the predetermined condition, the program is judged to have been tampered with. According to this technique, it is not necessary to generate a hash value, so that the time required for tamper detection is reduced.

Patent Document 1: U.S. Pat. No. 6,026,293
Patent Document 2: U.S. Pat. No. 6,178,509

DISCLOSURE OF THE INVENTION

Problems the Invention is Attempting to Solve

Unfortunately, however, the technique disclosed in Patent Document 2 is not sufficient although the time required for tamper detection is shorter than that required for Patent Document 1. According to Patent Document 2, the tamper detection is made based exclusively on the predetermined condition, so that the program is said to be verified only partly. Thus, tampering With a portion of the program not affecting the predetermined condition may be overlooked.

In view of the above problems, the present invention aims to provide a tamper detection system, method, program, recording medium, and integrated circuit for detecting tampering with a program at higher speed without compromising the detection accuracy, as compared with heretofore.

Means for Solving the Problems

In order to solve the above problems, the present invention provides a tamper detection system for detecting tampering with a program. The tamper detection system includes: a first processing unit operable to generate in-process authentication data from a program targeted for execution, by conducting a conversion process to shorten the target program; a first generating unit operable to generate authentication information from the in-process authentication data by conducting a summarization process that is higher in computational complexity than the conversion process; a holding unit operable to hold the authentication information; a second processing unit operable to generate in-process comparative data from the target program by conducting the conversion process; a second generating unit operable to generate comparative information from the in-process comparative data by conducting the summarization process; and a detection unit operable to detect tampering with the target program, by using the authentication information and the comparative information.

The tamper detection system includes the first and second processing units as characterizing features of the present invention. Yet, it is not necessary to implement the two processing units as two separate means. The first and second processing units may actually be implemented as a single means and this still falls within the scope of the present invention.

The same holds with respect to the first and second generating units each of which is a characterizing feature of the present invention and performs the summarization process. That is, it is not necessary to implement the two generating units as two separate means. The first and second generating units may actually be implemented as a single means and this still falls within the scope of the present invention.

Effects of the Invention

With the above configuration, the tamper detection system according to the present invention generates each of the authentication information and comparative information after reducing the size of a target program by conducting the conversion process. As a consequence, the authentication information and comparative information are generated at higher speed as compared with the case where the summarization process is conducted directly on the entire target program.

Optionally, the first processing unit may conduct the conversion process based on a parameter determined at random. The second processing unit may conduct the conversion process based on a parameter that is same as the parameter used by the first processing unit.

With the above configuration, the in-process authentication data is generated with the use of a random element determined for each conversion process and thus the in-process comparative data is also generated with the use of the random element. As a consequence, randomness is added to the authentication information generated from the in-process authentication data and also to the comparative information generated from the in-process comparative data. By virtue of the randomness, it is made difficult for an unauthorized third party to generate such information that is identical to the authentication information and/or the comparative information in an attempt to improperly pass the tamper detection. Consequently, the tamper detection device is enabled to avoid executing an unauthorized program.

Optionally, the generation of the authentication information by the first generating unit may be performed prior to execution of the target program. The generation of the comparative information by the second generating unit and the detection by the detection unit may both be performed during execution of the target program.

Optionally, the parameter may indicate a data size. The first and second processing units may each convert the target program into data having the data size indicated by the parameter.

With the above configuration, both the in-process authentication data and the in-process comparative data are generated to be equal in size to the size that is randomly determined for each conversion process. As a consequence, randomness is added to the authentication information generated from the in-process authentication data and also to the comparative information generated from the in-process comparative data. By virtue of the randomness, it is made difficult for an unauthorized third party to generate such information that is identical to the authentication information and/or the comparative information in an attempt to improperly pass the tamper detection. Consequently, the tamper detection device is enabled to avoid executing an unauthorized program.

The first and second processing units may each conduct the conversion process to divide the target program into a plurality of data blocks of the indicated data size and further conduct a digit-wise logical operation between the data blocks so that both the in-process authentication data and the in-process comparative data are generated to be equal in size to the indicated size.

The first and second processing units may each ct an exclusive OR operation as the logical operation.

With the above configuration, the program is shorten by conducting a logical operation that can be processed at high speed, so that the conversion process is completed within a short time.

Note that logical operations including exclusive OR are basic processing that a general processor can perform within one clock.

Optionally, the first generating unit may include cache memory and make, via the cache memory, an input/output access to memory storing the in-process authentication data. The first processing unit may conduct the conversion process, by using the parameter that indicates a size equal to or smaller than a unit size of the cache memory for data read and write.

With the above configuration, the size of data targeted for authentication process is limited to the unit size of the cache memory or less at maximum. With this arrangement, the conversion process is performed without requiring replacement of data stored on the cache memory, so that the speed of the tamper detection process is further improved.

Optionally, the first generating unit may calculate, as the authentication information, a hash value of the in-process authentication data. The second generating unit may calculate, as the comparative information, a hash value of the in-process comparative data.

Optionally, the first and second generating units may each use a SHA1 operation to calculate the hash value.

With the above configuration, the use of hash values makes it difficult for an unauthorized third party to generate such information that is identical to the authentication information and/or the comparative information. Consequently, the tamper detection is conducted based on the authentication information, and the comparative information of increased security.

Optionally, the first and second processing units may each (i) judge whether the target program contains a relocation code, which is a code to be relocated upon loading of the program, (ii) if a relocation code is contained, remove the relocation code from the target program, and (iii) convert a remaining part of the target program.

Optionally, the first and second processing units may each (i) judge whether the target program contains a relocation code, which is a code to be relocated upon loading of the target program, (ii) if a relocation code is contained, replace the relocation code with a predetermined non-relocation code, and (iii) convert the program whose relocation code has been replaced.

With the above configuration, even if the target program contains a relocation code, it is avoided that the comparative information disagrees with the authentication information because of the relocation code. It is ensured that the authentication information generated from one program and the comparative information generated from a corresponding program agrees with each other unless the corresponding program has been tampered with. Thus, the tamper detection is duly conducted with the use of the authentication information and the comparative information.

Optionally, the first processing unit may generate a random number as the parameter. The second processing unit may have the random number stored therein. The first and second processing units may each add, prior to the conversion, the random number to the target program.

with the above configuration, the authentication information and the comparative information are generated differently each time a program is loaded, so that it is made more difficult to make analysis.

Optionally, the first generating unit may generate a random number and calculate, as the authentication information, a hash value of the in-process authentication data by applying a hash function with the random number as a key. The second processing unit may have the random number stored therein and calculate, as the comparative data, a hash value of the in-process comparative data by applying the hash function with the random number as the key.

With the above configuration, a random number affects the contents of authentication information and comparative information, so that it is made more difficult to analyze the authentication information and the comparative information.

Optionally, the parameter may indicate a data size. The first processing unit may generate a plurality of pieces of in-process authentication data of different sizes, by conducting the conversion process on the target program a plurality of number of times based on each of a plurality of parameters. The first generating unit may generate a plurality of pieces of authentication information by conducting the summarization process on the respective pieces of in-process authentication data. The tamper detection system may further include a control unit operable to (i) select at least one of the plurality of pieces of authentication information, (ii) cause the second processing unit to generate, through the conversion process, the in-process comparative data that is equal in size to the selected piece of authentication information, and (iii) cause the detection unit to detect tampering with the target program, by using the selected piece of authentication information and the comparative information generated by the second generating unit.

Optionally, the control unit may (i) calculate a process status value relating to allocation of resources to processes being executed and (ii) select at least one of the plurality of pieces of authentication information based on the process status value.

Optionally, the control unit may have stored therein a correspondence table showing one or more process status values in correspondence with the plurality of pieces of authentication information, and select one of the plurality of pieces of authentication information associated with the calculated process value with reference to the correspondence table.

With the above configuration, the processing load imposed by the tamper detection can be changed according to the processing status of the tamper detection system. In the tamper detection according to the present invention, the processing load of the summarization process is heavier than that of the conversion process. That is, the processing load imposed on the tamper detection system increases with the size of data subjected to the summarization process. Yet, if the conversion process reduces a program in data size too much, the amount of information lost from the original program increases. This leads to a decrease in the tamper detection accuracy.

According to the present invention, the data size based on which the conversion process is conducted is determined according to the status of processes executed by the tamper detection system. Thus, the accuracy and speed of the tamper detection can be adjusted in view of the status of processes executed by the tamper detection system (e.g., the status of other programs).

Optionally, the first and second processing units may each randomly specify a portion of the target program, extract the specified portion, and generate a corresponding one of the in-process authentication data and the in-process comparative data from the extracted portion.

Optionally, the first processing unit may randomly generate information indicating an extract-start position and an extract-end position. The first and second processing units may each extract, from the target program, a portion staring at the extract-start position and ending at the extract-end position.

Optionally, the first processing unit may randomly generate information indicating an extract-start position and an extract-size. The first and second processing units may each extract, from the target program, a portion starting at the extract-start position and is equal to the extract-size.

With the above configuration, each piece of authentication information is generated from a different part of a target program. By virtue of this, it is made difficult for an unauthorized third party to generate unauthorized authentication information and/or comparative information in an attempt to improperly pass the tamper detection. Consequently, the tamper detection device is enabled to avoid executing an unauthorized program.

Optionally, the conversion process and the summarization process may use mutually different one-way functions.

With the above configuration, the in-process authentication data, in-process comparative data, authentication information, and comparative information are securely generated through the processes using different one-way functions.

In another aspect, the present invention provides a method for detecting tampering with a program. The method includes: a first processing step of generating in-process authentication data from a program targeted for execution, by conducting a conversion process to shorten the target program; a first generating step of generating authentication information from the in-process authentication data by conducting a summarization process that is higher in computational complexity than the conversion process; a holding step of holding the authentication information; a second processing step of generating in-process comparative data from the target program by conducting the conversion process; a second generating step of generating comparative information from the in-process comparative data by conducting the summarization process; and a detection step of detecting tampering with the target program, by using the authentication information and the comparative information.

In another aspect, the present invention provides a tamper detection program for used by a tamper detection system that detects tampering with a program. The tamper detection program includes code operable to cause a computer to execute: a first processing step of generating in-process authentication data from a program targeted for execution, by conducting a conversion process to shorten the target program; a first generating step of generating authentication information from the in-process authentication data by conducting a summarization process that is higher in computational complexity than the conversion process; a holding step of holding the authentication information; a second processing step of generating in-process comparative data from the target program by conducting the conversion process; a second generating step of generating comparative information from the in-process comparative data by conducting the summarization process; and a detection step of detecting tampering with the target program, by using the authentication information and the comparative information.

In another aspect, the present invention provides a computer-readable recording medium storing a tamper detection program that includes code operable to cause a computer to execute: a first processing step of generating in-process authentication data from a program targeted for execution, by conducting a conversion process to shorten the target program; a first generating step of generating authentication information from the in-process authentication data by conducting a summarization process that is higher in computational complexity than the conversion process; a holding step of holding the authentication information; a second processing step of generating in-process comparative data from the target program by conducting the conversion process; a second generating step of generating comparative information from the in-process comparative data by conducting the summarization process; and a detection step of detecting tampering with the target program, by using the authentication information and the comparative information.

In another aspect, the present invention provides an integrated circuit for detecting tampering with a program. The integrated circuit includes: a first generating unit operable to generate authentication information from the in-process authentication data by conducting a summarization process that is higher in computational complexity than the conversion process; a holding unit operable to hold the authentication information; a second processing unit operable to generate in-process comparative data from the target program by conducting the conversion process; a second generating unit operable to generate comparative information from the in-process comparative data by conducting the summarization process; and a detection unit operable to detect tampering with the target program, by using the authentication information and the comparative information.

With the above configuration, each of the authentication information and comparative information is generated after reducing the size of a target program by conducting the conversion process. As a consequence, the authentication information and comparative information are generated at higher speed as compared with the case where the summarization process is conducted directly on the entire target program.

Optionally, the integrated circuit may be a Trusted Platform Module.

With the above configuration, a secure execution environment is provided for the tamper detection process.

In another aspect, the present invention provides an authentication information generating device for generating authentication information to be used for detecting tampering with a program. The authentication information generating device includes: a processing unit operable to generate in-process authentication data from a program targeted for execution, by conducting a conversion process to shorten the target program; a generating unit operable to generate authentication information from the in-process authentication data by conducting a summarization process that is higher in computational complexity than the conversion process; and a supplying unit operable to supply the authentication information to a tamper detection device.

With the above configuration, the authentication information generating device generates authentication information after reducing the size of a target program by conducting the conversion process. Thus, the authentication information is generated at higher speed, as compared with the case of generating authentication information by conducting the computationally expensive summarization process directly on the entire target program.

In another aspect, the present invention provides a tamper detection device for detecting tampering with a program. The tamper detection device includes: a holding unit operable to hold authentication information that is generated from a program targeted for execution, by conducting a conversion process based on a random number to shorten the target program and further conducting a summarization process that is higher in computational complexity than the conversion process; a processing unit operable to generate in-process comparative data from the target program by conducting the conversion process; a second generating unit operable to generate comparative information from the in-process comparative data by conducting the summarization process; and a detection unit operable to detect tampering with the target program, by using the authentication information held in the holding unit and the comparative information generated by the generating unit.

With the above configuration, the tamper detection device generates comparative information after reducing the size of a target program by conducting the conversion process. Thus, the comparative information is generated at higher speed, as compared with the case of generating comparative information by conducting the computationally expensive summarization process directly on the entire target program. As a result, the time required for tamper detection is reduced.

BRIEF DESCRIPTION OF THE DRAWINGS

FIG. 2 is a view showing one example of an authentication data list according to Embodiment 1 of the present invention;

FIG. 8 is a view showing one example of an authentication data list according to Embodiment 2 of the present invention;

FIG. 15 is a view illustrating an overview of authentication data according to a modification of the present invention.

REFERENCE NUMERALS

Figure 1:
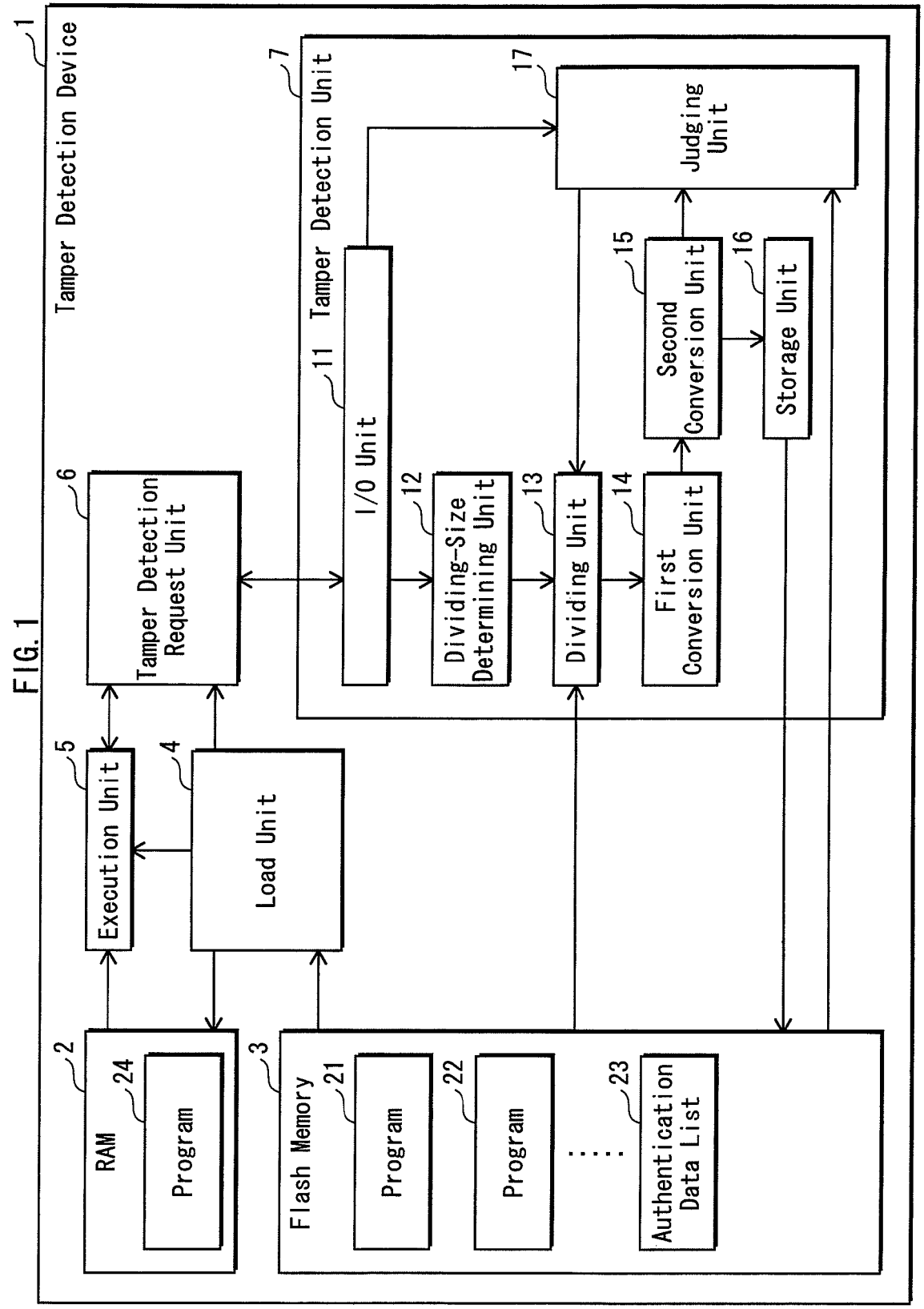
FIG. 1 is a block diagram of the overall structure of a tamper detection device according to Embodiment 1 of the present invention.

| | |
|---|---|
| 1 | Tamper Detection Device |
| 2 | RAM |
| 3 | Flash Memory |
| 4 | Load Unit |
| 5 | Execution Unit |
| 6 | Tamper Detection Request Unit |
| 7 | Tamper Detection Unit |
| 11 | I/O Unit |
| 12 | Dividing-Size Determining Unit |
| 13 | Dividing Unit |
| 14 | First Conversion Unit |
| 15 | Second Conversion Unit |
| 16 | Storage Unit |
| 17 | Judging Unit |
| 23 | Authentication Data List |

BEST MODE FOR CARRYING OUT THE INVENTION

A tamper detection device according to one embodiment of the present invention performs a tamper detection process at a higher speed than hitherto without compromising the security level as much as possible, although the security level is usually in a trade-off relation with the processing speed.

The tamper detection device has a program stored on ROM and loads the program to RAM to execute the loaded program. Before loading the program to the RAM, the tamper detection device generates, as tamper detection information, authentication data from the program residing on the ROM by conducting the process described below. During execution of the program loaded to the RAM, the tamper detection device generates, as tamper detection information, comparative data from the program residing on the RAM by conducting the process described below. The tamper detection device then compares the comparative data with the authentication data to see if the two pieces of data agree. If the comparative data disagrees with the authentication data, the tamper detection device judges that the program has been tampered with.

The authentication data and comparative data are generated through the following processes.

First of all, the tamper detection device divides a program targeted for tamper detection into a plurality of blocks and applies a first hash function to the resulting blocks. The first hash function is one example of a data compaction process with a relatively low load. By applying the first hash function, the target program is converted to intermediate conversion data that is smaller in size.

The tamper detection device then applies a second hash function to the intermediate conversion data to generate tamper detection information. The second hash function imposes a relatively heavy load. By applying the second hash function, tamper detection information is generated.

One specific example of the first hash function is a logical operation of exclusive OR, and one specific example of the second hash function is a SHA1 function.

The SHA1 function is a time consuming process but conducted on the intermediate conversion data, which is smaller in size than the original target program. Thus, the processing time is significantly reduced as compared with the processing time taken for conducting the SHA1 process on the entire program.

Note once again that the authentication data is the tamper detection information generated from the program before loading, whereas the comparative data is the tamper detection information generated from the program after loading.

According to this embodiment, the security level of the first hash function is lower than that of the second hash function. In view of this, the first hash function involves the use of a random number to add randomness, so that an adequate security level is ensured.

The following describes embodiments of the present invention in detail.

1. Embodiment 1

First of all, the following describes Embodiment 1 of the present invention.

1.1. Structure

A tamper detection device 1 consistent with Embodiment 1 of the present invention loads a program from nonvolatile Memory such as flash memory to volatile memory such as RAM to execute the loaded program and detects tampering with the running program.

The tamper detection device 1 specifically is a computer system that includes a CPU (Central Processing Unit), ROM (Read Only Memory), RAM (Random Access Memory), a display unit and a keypad. The ROM stores a computer program and the CPU operates according to the computer program loaded to the RAM to implement the functionality of the tamper detection device 1.

FIG. 1 is a block diagram of the overall structure of the tamper detection device 1.

As shown in FIG. 1, the tamper detection device 1 includes RAM 2, flash memory 3, a load unit 4, an execution unit 5, a tamper detection request unit 6, and a tamper detection unit 7. The following separately describes each component unit.

The RAM 2 is random access memory. Before execution of a program, the program is loaded to the RAM 2 by the load unit 4. During execution of the loaded program, various pieces of runtime data are written into and read from the RAM 2 by the execution unit 5.

The flash memory 3 specifically is Flash ROM. The flash memory 3 is used to store programs to be executed and an authentication data list.

As shown in FIG. 1, the flash memory 3 in this embodiment stores programs 21, 22 . . . to be executed. The authentication data list 23 includes authentication data used for tamper detection and will be described later in detail.

The program 24 residing on the RAM 2 may be, for example, the program 21 loaded from the flash memory 3 to the RAM 2.

The load unit 4 loads one or more of the programs stored on the flash memory 3 to the RAM 2 with appropriate timing.

More specifically, the appropriate timing may be the time of power-up, the time of receiving a load instruction from another program, and the time of expiration of a predetermined time interval.

The load unit 4 stores in advance information indicating various timings of loading associated with program identifiers identifying the programs to be loaded at the respective timings.

One of the timings may additionally be the time of receiving a user operation made on the keypad to request execution of a program. In this case, the program identifier is also designated by a user operation.

Upon detecting that any of the timings is met, the load unit 4 starts loading a program identified by the program identifier, from the flash memory 3 to the RAM 2. Upon starting the loading, the load unit 4 transmits to the tamper detection request unit 6 a load-start notification that includes the program identifier identifying the program being loaded.

At this time, the load unit 4 adds information regarding the program being loaded to the authentication data list stored on the flash memory 3. If the flash memory 3 has not yet stored any authentication data list, the load unit 4 newly generates an authentication data list and stores the newly generated authentication data list to the flash memory 3.

FIG. 2 shows one example of the authentication data list.

The authentication data list 23 has columns of a program identifier 41, program address 42, program size 43, block size 44, and authentication data 45.

Each program identifier 41 is information that uniquely identifies a corresponding program. Each program stored on the flash memory 3 is attached with a program identifier assigned in advance.

Each program address 42 indicates the starting address of an area of the RAM 2 used by the load unit 4 to load a corresponding program.

Each program size 43 indicates the size of the program identified by a corresponding program identifier 41.

At the start of loading a program, the load unit 4 also reads from the flash memory 3 the program identifier of the program. The load unit 4 then adds to the authentication data list 23 a new entry indicating the read program identifier as a program identifier 41, the address of a RAM area used to store the loaded program as a program address 42, and the size of the loaded program as a program size 43.

As indicated by blank fields 46 and 47 in FIG. 2, immediately after the above-described addition is made to the authentication data list 23, the values of block size and authentication data in the new entry having the program identifier "0003" are left blank.

The values of block size and authentication data are written into the authentication data list 23 by a component unit other than the load unit 4. Details of the block size 44 and authentication data 45 will be given later.

Upon completion of the program loading, the load unit 4 issues to the execution unit 5 an execution instruction that contains the program identifier of the program to be executed.

In addition, if execution of a loaded program by the execution unit 5 is canceled, the load unit 4 deletes from the authentication data list 23 a corresponding entry indicating the program identifier, program address, program size, block size, and authentication data of the program. The timing for deleting the entry may be determined appropriately, such as when the loaded program is deleted from the RAM 2.

The execution unit 5 specifically is a CPU.

Upon receipt of an execution instruction from the load unit 4, the execution unit 5 executes a program identified by the program identifier contained in the execution instruction, from among the programs residing on the RAM 2.

With an appropriate timing, the execution unit 5 issues to the tamper detection request unit 6 a trigger notification that contains the program identifier of the program being executed. The trigger notification serves to trigger execution of tamper detection by the tamper detection request unit 6.

The timing for issuing a trigger notification may be the time at which the execution unit 5 initiates execution of a specific program determined in advance or of a specific module or subroutine of a program determined in advance.

Upon receipt of an execution stop instruction from the tamper detection request unit 6, the execution unit 5 stops execution of the program identified by the program identifier contained in the execution stop instruction.

The tamper detection request unit 6 performs control of tamper detection conducted on a program residing on the flash memory 3.

The tamper detection request unit 6 receives a load-start notification from the load unit 4 and issues a request for generating authentication data of a program identified by the program identifier contained in the load-start notification to the tamper detection unit 7.

The authentication data to be generated is used in tamper detection. Details of the authentication data will be described later.

In addition, the tamper detection request unit 6 detects a trigger for executing tamper detection during the time the program is being executed by the execution unit 5.

Upon detecting a trigger, the tamper detection request unit 6 issues a tamper detection request that contains the program identifier of the program being executed to the tamper detection unit 7. In response to the tamper detection request, the tamper detection request unit 6 receives a tamper detection response containing the program identifier and the result of the tamper detection from the tamper detection unit 7.

The tamper detection result indicates whether or not the program has been tampered with.

If the tamper detection result indicates that tampering with the program has been detected, the tamper detection request unit 6 issues an execution stop instruction containing the program identifier contained in the received tamper detection response to the execution unit 5. On the other hand, if the tamper detection result indicates that no tampering has been detected, the tamper detection request unit 6 issues no instruction to the execution unit 5.

Note that a trigger for execution of tamper detection described above is caused to occur with appropriate timing for initiating tamper detection. For example, the tamper detection request unit 6 may generate a trigger at a regular interval and detect the trigger. Alternatively, the execution unit 5 may issue a notification to the tamper detection request unit 6 upon start executing a predetermined module of the program, and the tamper detection request unit 6 detects the notification as a trigger.

As shown in FIG. 1, the tamper detection unit 7 includes an I/O unit 11, a dividing-size determining unit 12, a dividing unit 13, a first conversion unit 14, a second conversion unit 15, a storage unit 16, and a judging unit 17. The following separately describes each component unit.

The I/O unit 11 receives from the tamper detection request unit 6 a request for generating authentication data and transmits a program identifier contained in the received request to the dividing-size determining unit 12.

The I/O unit 11 receives a tamper detection request from the tamper detection request unit 6 and transmits the received tamper detection request to the judging unit 17.

The dividing-size determining unit 12 determines a block size BS by which the target program is divided into a plurality of blocks. Hereinafter, the process of dividing the target program into a plurality of blocks is referred to as block splitting.

The dividing-size determining unit 12 receives a request for generating authentication data from the I/O unit 11. Upon receipt of the request, the dividing-size determining unit 12 generates a random number and determines the block size BS based on the random number.

In one example, the random number generated is directly used as the block size BS. Since the random number is re-calculated each time a program is loaded to the RAM, the block size BS is changed according to the value of the re-calculated random number.

Once the block size BS is determined in the above manner, the dividing-size determining unit 12 issues a dividing instruction to the dividing unit 13. The dividing instruction contains the program identifier, block size BS, and the data type indicating the type of data to be generated.

The type of data to be generated indicates either authentication data or comparative data. In accordance with the indicated data type, the processes to be conducted by the component units, such as the dividing unit 13 and the second conversion unit 15, are selected.

Both the authentication data and comparative data are generated by the first conversion unit 14 and the second conversion unit 15 and used for tamper detection. However, the authentication data is generated from the program before being loaded, whereas the comparative data is generated from the program after being loaded.

Note that a dividing instruction to the dividing unit 13 is also issued by the judging unit 17 as will be described later. The dividing instruction issued by the judging unit 17 contains the program identifier, the block size BS, and the data type indicating that comparative data is to be generated.

Upon receipt of a dividing instruction, the dividing unit 13 reads from the flash memory 3 a program identified by the program identifier contained in the received dividing instruction. Then, the dividing unit 13 reads the program size corresponding to the program identifier from the authentication data list 23.

The dividing unit 13 then conducts a padding process based on the read program size.

Specifically, the padding process is to add empty data (e.g. 0s) to the end of the program to ensure the program size is equal to an integral multiple of the block size BS.

The dividing unit 13 then divides the padded program into a plurality of data blocks each having the block size BS.

By the block splitting, N data blocks (B[1]-B[N]) each having the block size BS are generated.

Upon completion of the block splitting, the dividing unit 13 issues a first conversion instruction to the first conversion unit 14. The first conversion instruction issued herein contains the program identifier and the generation data type both contained in the dividing instruction. In the case where the generation data type indicates that authentication data is to be generated, the dividing unit 13 updates the authentication data list 23, by adding the block size BS into the entry corresponding the program identifier contained in the dividing instruction.

With reference to the example shown in FIG. 2, in the case where the value of the program identifier is "0003" and the determine block size is 4,096 bytes, the dividing unit 13 writes the value "4096" into the blank field 46.

Upon receipt of a first conversion instruction, the first conversion unit 14 converts the data blocks obtained as a result of the block splitting by the dividing unit 13, into data of a smaller size using a predetermined algorithm.

Preferably, this conversion process is a process, such as a simple logical operation, that can be executed at high speed.

In this embodiment, the conversion process conducted by the first conversion unit 14 is the XOR (exclusive OR) operation. That is, the first conversion unit 14 conducts the logical XOR operation sequentially between blocks B[1]-B[N].

The first conversion unit 14 then issues a second conversion instruction to the second conversion unit 15. The second conversion instruction issued hereby contains the program identifier and the generation data type both contained in the first conversion instruction and also contains the intermediate authentication data, which is the result of the conversion process.

Upon receipt of a second conversion instruction, the second conversion unit 15 converts the intermediate authentication data contained in the received second conversion instruction, by using a predetermined algorithm.

The data conversion process conducted by the second conversion unit 15 is a relatively time-consuming process of calculating a tamper detection value.

In this embodiment, the conversion process conducted by the second conversion unit 15 is a process of applying SHA1 function, which is a one-way function.

The second conversion unit 15 conducts the SHA1 process on the intermediate authentication data.

In the case where the second conversion instruction indicates the type of data to be generated is authentication data, the second conversion unit 15 transmits, as authentication data, the data obtained through the SHA1 process to the storage unit 16 together with the program identifier. On the other hand, in the case where the type of data to be generated is comparative data, the second conversion unit 15 transmits, as comparative data, the data obtained through the SHA1 process to the judging unit 17 together with the program identifier.

Upon receipt of the program identifier and authentication data from the second conversion unit 15, the storage unit 16 writes the authentication data to the authentication data list 23 in an appropriate entry corresponding to the received program identifier.

With reference to the example shown in FIG. 2, suppose that the thus generated authentication data is authentication data A3 and the value of the program identifier is "003". In this case, the storage unit 16 writes the authentication data A3 in the blank field 47.

The judging unit 17 receives a tamper detection request from the tamper detection request unit 6 via the I/O unit 11 and searches the authentication data list 23 for a program identifier that matches the program identifier contained in the received tamper detection request. On finding a matching program identifier, the judging unit 17 reads the block size corresponding to the matching program identifier from the authentication data list 23. The judging unit 17 then issues to the dividing unit 13 a dividing instruction that contains the program identifier, the block size, and the data type indicating that comparative data is to be generated.

In response to issuance of the dividing instruction, the judging unit 17 receives a program identifier and comparative data from the second conversion unit 15.

Upon receipt of the program identifier and comparative data, the judging unit 17 reads, from the authentication data list 23, authentication data corresponding to the received program identifier and compares the received comparative data with the read authentication data.

If the comparative data agrees with the authentication data, it is judged that the target program has not been tampered with. On the other hand, if the comparative data disagrees with the authentication data, it is judged that the target program has been tampered with. In either case, the judging unit 17 issues a tamper detection response that contains the tamper detection result to that effect and also contains the program identifier received from the second conversion unit 15. The tamper detection response is issued to the tamper detection request unit 6 via the I/O unit 11.

1.2. Operation

The following describes the tamper detection process performed by the tamper detection device 1 having the above structure.

Figure 3:
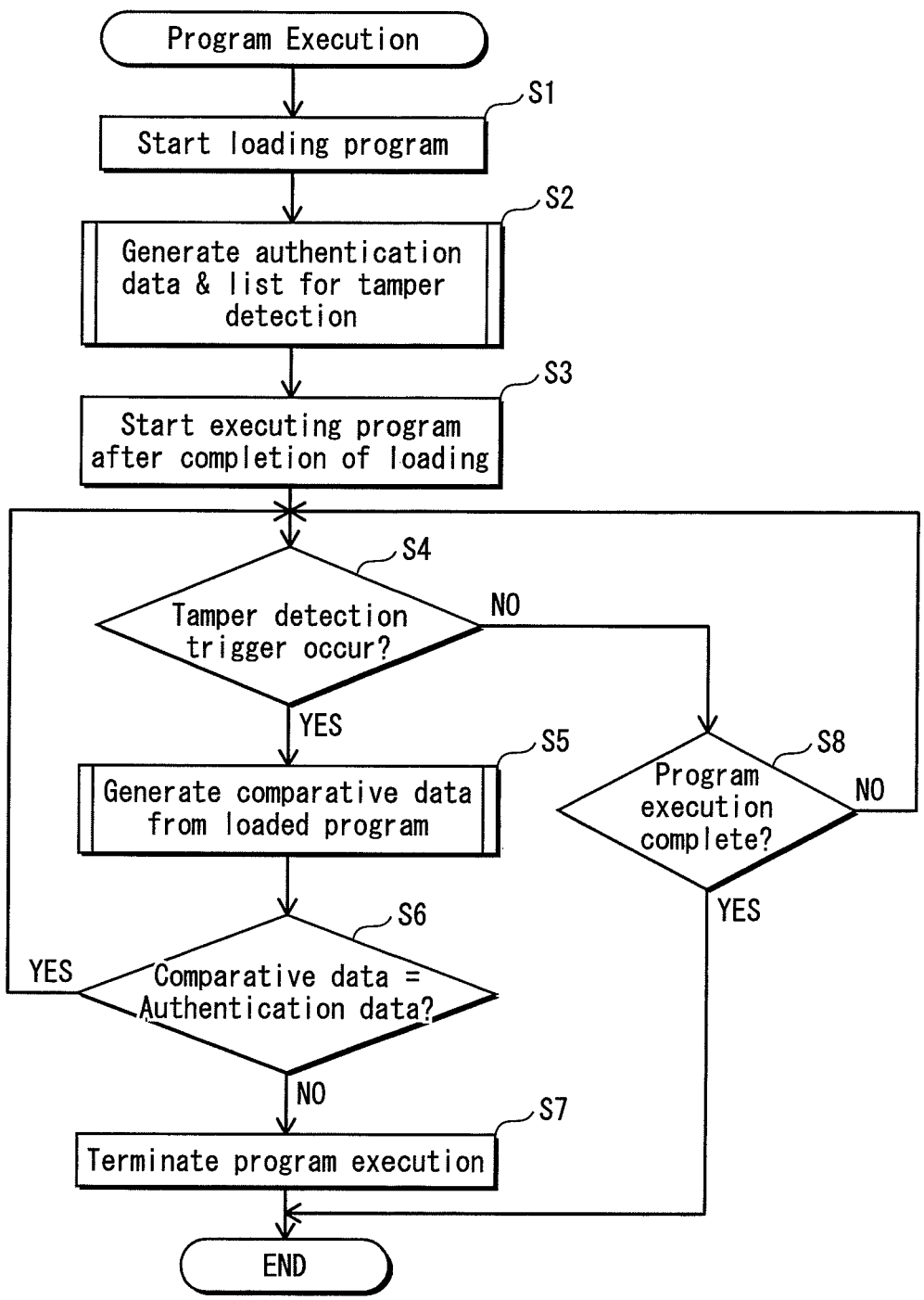
FIG. 3 is a flowchart of a program execution operation of the tamper detection device according to Embodiment 1 of the present invention.

FIG. 3 is a flowchart of a program execution operation of the tamper detection device 1.

First of all, with an appropriate timing, the load unit 4 reads a program being an execution target by the execution unit 5 from the flash memory 3 and starts loading the read program to the RAM 2 (Step S1). Upon start loading the program, the load unit 4 issues to the tamper detection request unit 6 a load-start notification that contains the program identifier identifying the program being loaded. Upon receipt of the load-start notification, the tamper detection request unit 6 issues a request for generating authentication data to the tamper detection unit 7. The request issued herein contains the program identifier contained in the received load-start notification.

Upon receipt of the request for generating authentication data, the tamper detection unit 7 generates authentication data for use in tamper detection of the program and also generates an authentication data list (Step S2). The details of Step S2 will be given later with reference to FIG. 4.

Upon completion of loading of the program to the RAM 2, the load unit 4 issues to the execution unit 5 an execution instruction containing the program identifier identifying the loaded program.

The execution unit 5 starts executing the loaded program identified by the program identifier contained in the received execution instruction (Step S3).

Although the flowchart in FIG. 3 shows that Steps S2 and S3 are executed in sequence, Steps S2 and S3 may be executed in parallel.

Thereafter, the tamper detection request unit 6 monitors for occurrence of a tamper detection trigger (Step S4).

If no tamper detection trigger occurs (Step S4: NO) and execution of the program completes (Step S8: YES), the processing ends.

At the occurrence of a tamper detection trigger (Step S4: YES), the tamper detection request unit 6 issues to the tamper detection unit 7 a tamper detection request that contains the program identifier of the program loaded in Step S2.

Upon receipt of the tamper detection request, the tamper detection unit 7 generates comparative data described above, from the loaded program identified by the program identifier contained in the received tamper detection request (Step S5). Details of Step 5 will be described later.

Then, the judging unit 17 included in the tamper detection unit 7 reads a corresponding piece of authentication data from the authentication data list 23 and compares the comparative data generated in Step S5 against the read piece of authentication data (Step S6).

If the comparative data agrees with the authentication data (Step S6: YES), the tamper detection unit 7 transmits a tamper detection response containing a tamper detection result indicating no tampering and also containing the program identifier, to the tamper detection request unit 6 via the I/O unit 11.

Upon receipt of the tamper detection result indicating no tampering, the tamper detection request unit 6 performs no further operation. As a result, the processing steps from Step S4 onward are repeated.

On the other hand, if the comparative data disagrees with the authentication data (Step S6: NO), the tamper detection unit 7 transmits a tamper detection response containing a tamper detection result indicating that the target program has been tampered with and also containing the program identifier, to the tamper detection request unit 6 via the I/O unit 11.

Upon receipt of the tamper detection response that contains the tamper detection result indicating that the target program has been tampered with, the tamper detection request unit 6 transmits an execution stop instruction containing the program identifier contained in the received, the tamper detection response to the execution unit 5.

Upon receipt of the execution stop instruction, the execution unit 5 terminates execution of the program identified by the program identifier contained in the execution stop instruction (Step S7).

Next, the details of Step S2 are described with reference to FIG. 4.

Figure 4:
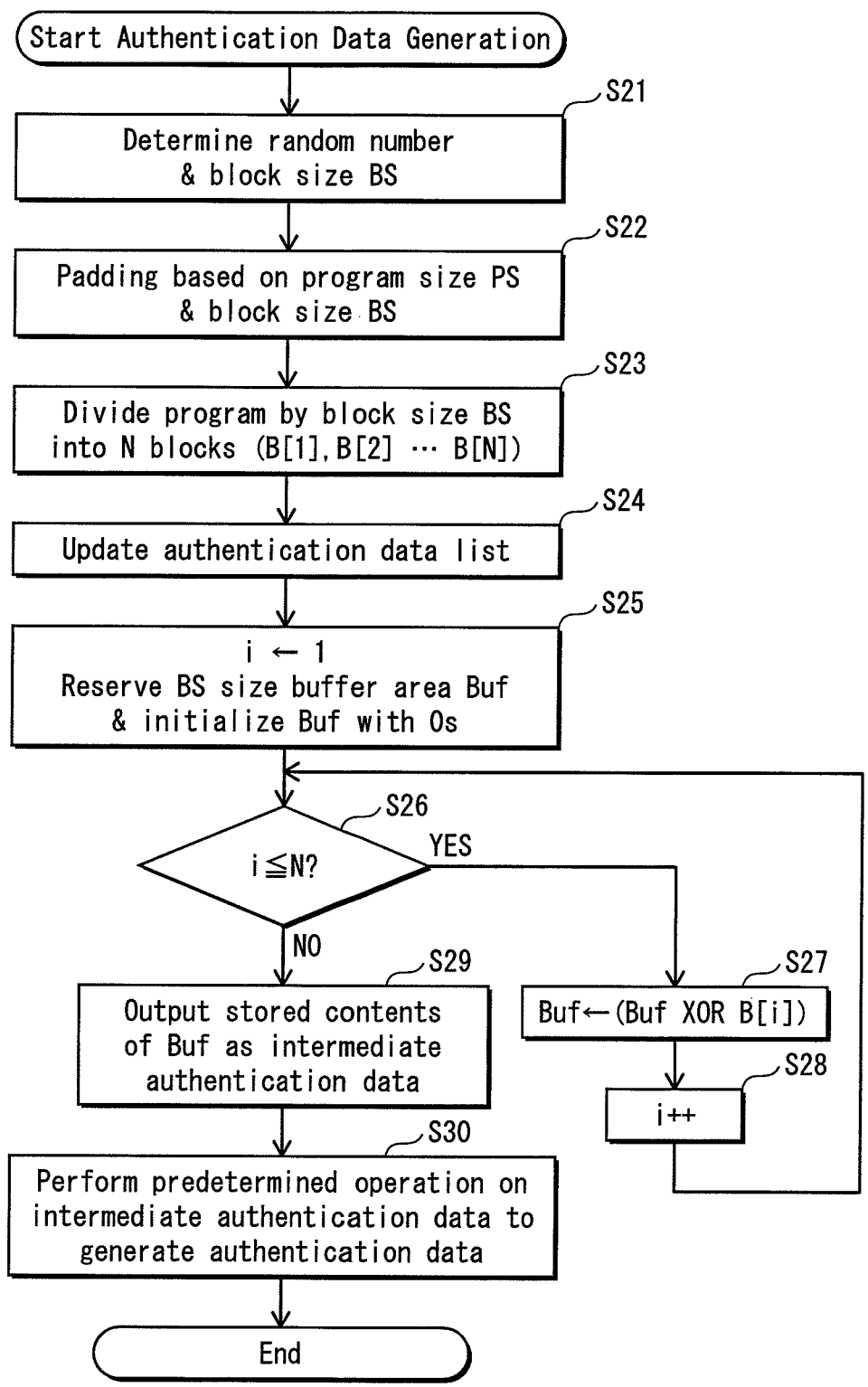
FIG. 4 a flowchart of an authentication data generating process according to Embodiment 1 of the present invention.

FIG. 4 shows the details of the authentication data generating process performed in Step S2.

First of all, the I/O unit 11 included in the tamper detection unit 7 receives a request for generating authentication data from the tamper detection request unit 6. The request contains the program identifier.

The I/O unit 11 transmits the authentication data generation request to the dividing-size determining unit 12.

Upon receipt of the authentication data generation request, the dividing-size determining unit 12 generates a random number and determines the block size BS based on the random number (Step S21).

The dividing-size determining unit 12 transmits to the dividing unit 13 a dividing instruction that contains the program identifier, block size, and the generation data type indicating that authentication data is to be generated.

Upon receipt of the dividing instruction, the dividing unit 13 reads the program identified by the program identifier contained in the dividing instruction, from the flash memory 3. Next, the dividing unit 13 reads the program size PS corresponding to the program identifier from the authentication data list 23.

The dividing unit 13 then performs padding of the read program, based on the program size PS (Step S22).

Next, the dividing unit 13 divides the padded program into a plurality of data blocks (B[1]-B[N]) each having the block size BS (Step S23).

After the block splitting completes, the dividing unit 13 transmits to the first conversion unit 14 a first conversion instruction containing the program identifier and the generation data type both contained in the received dividing instruction.

Next, the dividing unit 13 updates the authentication data list 23, by adding the block size BS in the entry corresponding to the program identifier contained in the dividing instruction (Step S24).

The first conversion unit 14 initializes a variable i to the value "1" and reserves a buffer area Buf having the size equal to the block size BS and initialized the contents of the buffer area Buf to the value "0" (Step S25).

When $i \leq N$ (Step S26: YES), the first conversion unit 14 takes the exclusive OR (XOR) of Buf and B[i] and overwrites the buffer area Buf with the result of the exclusive OR (Step S27). In the figure, this operation is expressed by the equation Buf=Buf XOR B[i].

Then, the first conversion unit 14 increments the variable i by "1" (Step S28) and then goes back to Step S26.

When i>N (Step S26: NO), the first conversion unit 14 outputs the program identifier to the second conversion unit 15, along with the contents of Buf as intermediate authentication data (Step S29).

Next, the second conversion unit 15 conducts the predetermined operation of the SHA1 process on the intermediate authentication data to generate authentication data, which is a 20-byte hash value (Step S30).

The second conversion unit 15 transmits the authentication data obtained as a result of the SHA1 process, to the storage unit 16 together with the program identifier.

Figure 5:
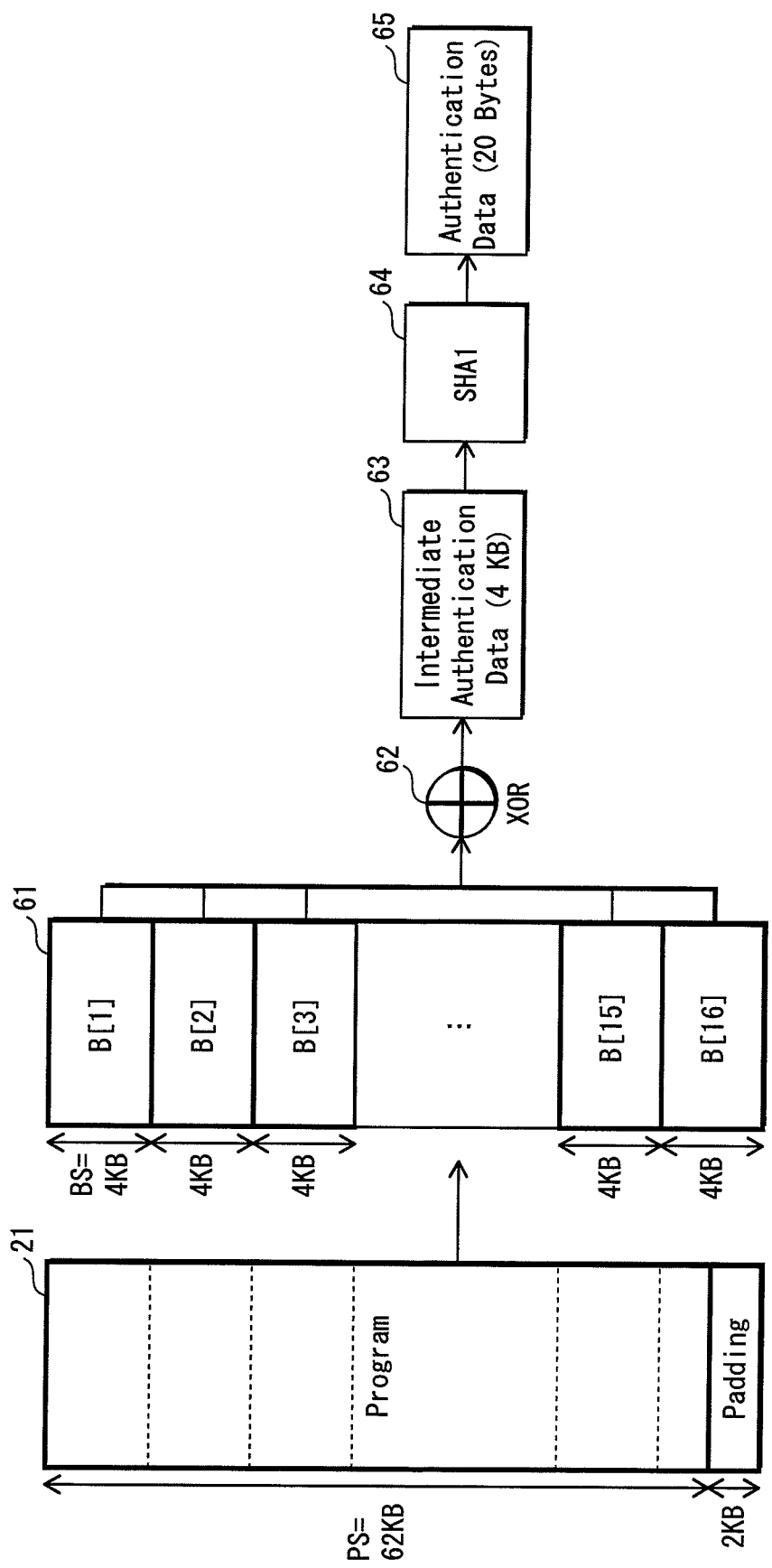
FIG. 5 is a view illustrating changes of data during the authentication data generating process according to Embodiment 1 of the present invention.

Since the changes of data handled in the authentication data generating process in Step S2 are important, supplementary description is given with reference to FIG. 5.

FIG. 5 illustrates changes that data used to generate authentication data go through.

The program 21 is a program targeted for tamper detection. The size of the program 21 is 62 KB and the block size BS determined by the dividing-size determining unit 12 is 4 KB.

The program 21 is padded.

Here, data used to pad the program is empty data, such as 0s.

The size of the padded program is equal to an integral multiple of the 4 KB block size.

In the example shown in FIG. 5, the program 21 is padded by adding 2 KB padding data added at the end thereof.

Thus, the total size of the program 21 after padding is 64 KB (item denoted by the reference numeral 21 in FIG. 5).

Then, the 64 KB program 21 is divided into a plurality of 4 KB blocks.

In FIG. 5, the program denoted by the reference numeral 61 is obtained by the block splitting.

In this example, the program is divided into 16 blocks B[1], B[2] . . . B[16].

Next, an XOR operation 62, which is the conversion process performed by the first conversation unit 14, is conduced sequentially on the data blocks through Steps S25-S27, S29 and S30 shown in FIG. 4.

By repeating the XOR operation 62, the data blocks are ultimately converted into 4 KB data and this data is referred to as intermediate authentication data 63.

When the XOR operation is symbolized by (+), the intermediate authentication data 63 is then expressed as a result of B[1](+)B[2](+) . . . (+)B[16].

Next, the SHA1 process 64 is applied by the second conversion unit 15 on the intermediate authentication data 63, so that authentication data 65 which is a 20-byte hash value is generated.

Figure 6:
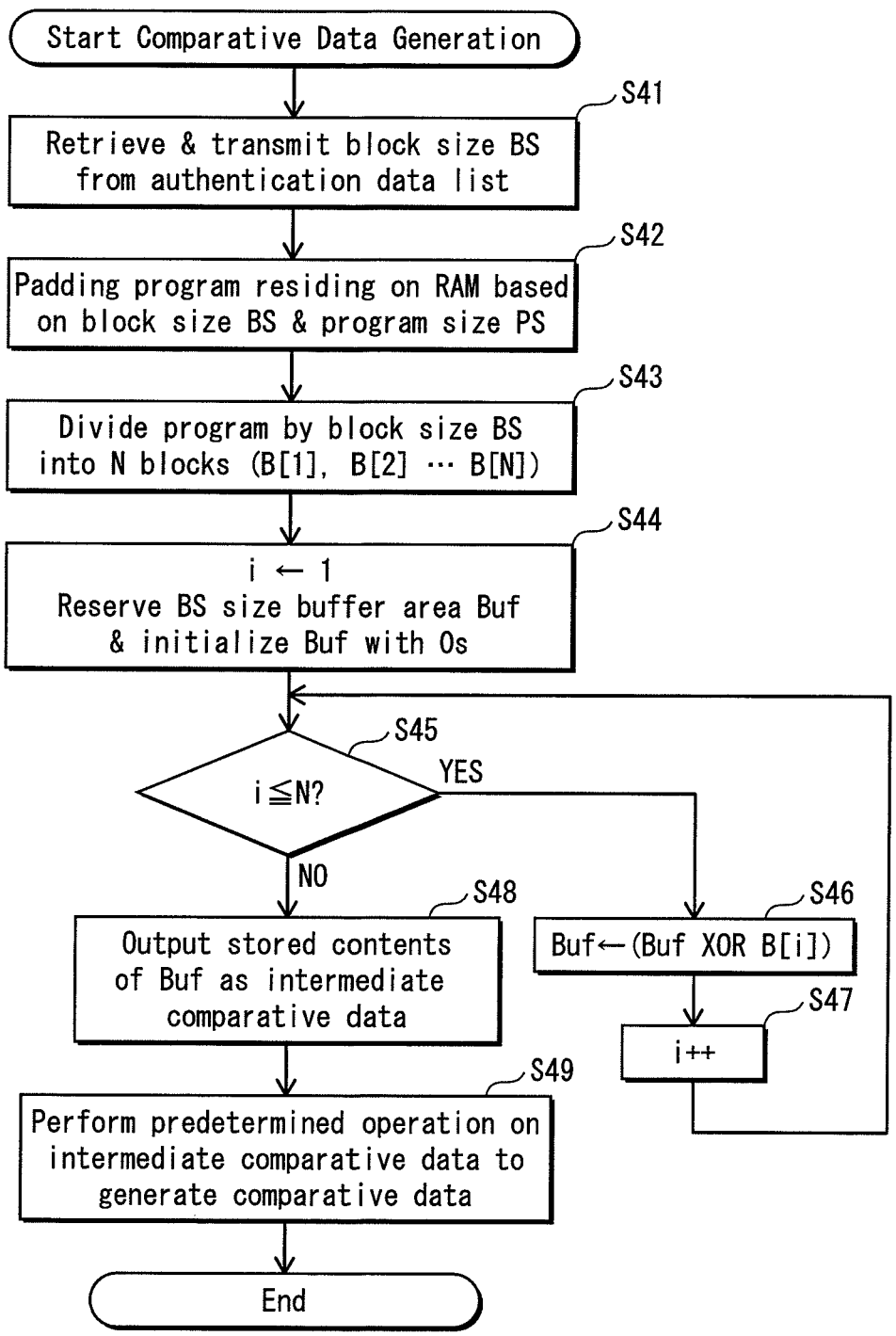
FIG. 6 is a flowchart of a comparative data generating process according to Embodiment 1 of the present invention.

The following now describes the details of Step S5 shown in FIG. 3, with reference to FIG. 6.

FIG. 6 shows the details of the comparative data generating process performed in Step S5.

The I/O unit 11 of the tamper detection unit 7 receives a tamper detection request from the tamper detection request unit 6 and passes the received tamper detection request to the judging unit 17.

The judging unit 17 receives the tamper detection request from the tamper detection request unit 6 via the I/O unit 11. The judging unit 17 then searches the authentication data list 23 for a program identifier that matches the value of the program identifier contained in the received tamper detection request. On finding a matching program identifier, the judging unit 17 reads, from the authentication data list 23, the block size BS corresponding to the matching program identifier. Then, the judging unit 17 transmits a dividing instruction containing the program identifier, the block size BS, and the generation data type indicating that comparative data is to be generated to the dividing unit 13 (Step S41).

Upon receipt of the dividing instruction, the dividing unit 13 reads the program size corresponding to the received program identifier from the authentication data list 23. Then, the dividing unit 13 identifies one of the programs residing on the RAM 2 with the received program identifier and pads the thus identified program based on the read program size PS (Step S42). The process of padding is the same as that described with reference to Step S22.

Next, the dividing unit 13 divides the padded program by the block size BS into a plurality of data blocks (B[1]-B[N]) (Step S43). This block splitting process is the same as that described with reference to Step S23.

After the block splitting, the dividing unit 13 transmits, to the first conversion unit 14, a first conversion instruction that contains the program identifier and the generation data type both contained in the received dividing instruction.

Then, the first conversion unit 14 conducts the XOR operation sequentially on the blocks generated in Step S43 and stores the result in Buf in the same manner as described in Steps S25-S28 (Step S44-S47).

The first conversion unit 14 outputs the contents of Buf as the intermediate comparative data to the second conversion unit 15.

The second conversion unit 15 conducts the predetermined operation of SHA1 process on the intermediate comparative data to generate comparative data which is a 20-byte hash value (Step S49). This completes the comparative data generating process.

Through the above processing steps, the tamper detection device of the present embodiment is enabled to detect any authorized alteration of a program residing on RAM and thus to prevent execution of such an unauthorized program on the RAM.

1.3. Supplementary Explanation of Effects

The following describes the effects achieved by the structure consistent with Embodiment 1 in greater detail.

According to a conventional tamper detection technique, the hash value serving as authentication data of a target program is generated by applying a one-way function, such as SHA1, directly to the entire target program.

For this reason, if the size of a program targeted for tamper detection is large, an enormous amount of processing time is required to generate a hash value of the program.

In contrast, the tamper detection device 1 according to this embodiment first converts a target program into smaller data by the first conversion unit 14 through an extremely low-load process such as XOR. Thus, the data amount is reduced at high speed without losing the characteristics of the original program. Then, the second conversion unit 15 converts this smaller data through a relatively high-load process such as SHA1 process. With this arrangement, the overall processing time for tamper detection is reduced.

With the above structure, in the case where the first conversion unit 14 divides a target block always by the same block size, it may be easier for a malicious party to reveal the first data conversion process conducted by the first conversion unit 14. If the first conversion process is revealed, the risk arises that an authentic program is maliciously altered without affecting the result that would be obtained by the first conversion process.

In order to address the above risk, the tamper detection device according to this embodiment randomly determines the block size to make it more difficult to guess.

With this arrangement, in order to alter the target program without changing the result that would be obtained by the first conversion process, a third party is required to find out the block size BS. This improves the security even if the first conversion process per se is revealed.

Further, the tamper detection device according to this embodiment randomly determines the block size BS each time a program is loaded to the flash memory. Since each program loaded is divided by a different block size, unauthorized analysis on one program does not directly reveal the block size by which another program is divided. Consequently, this arrangement ensures to more effectively prevent unauthorized tampering or alteration of programs.

As described earlier, the first conversion unit 14 conducts the XOR operation that is lower in security level than the SHA1 operation conducted by the second conversion unit 15. Yet, since the dividing-size determining unit 12 determines the block size BS based on a random number, the tamper detection is performed without compromising the security level.

Still further, authentication data is dynamically generated through the authentication data generating process, it is not required to keep the execution log on memory as is required by conventional techniques. In addition, it is not necessary to prepare and retain authentication data in advance. These advantages will effect saving of memory space. In addition, this arrangement eliminates the risk that the data retained on the memory is stolen and used for unauthorized tampering.

2. Embodiment 2

In Embodiment 1, a single piece of authentication data is generated for a single program targeted for tamper detection. In Embodiment 2 of the present invention, a plurality of pieces of authentication data are generated for one and the same target program. Each of a plurality of pieces of authentication data is generated with the use of a different block size BS. One of the plurality of pieces of authentication data is selected in accordance with the status of processes being executed on the tamper detection device (hereinafter, simply "process status"). Tamper detection of the target program is performed by comparing comparative data to the selected piece of authentication data.

Regarding the component units of the tamper detection device, the tamper detection unit 7 according to Embodiment 2 is identical in structure to that of Embodiment 1 described with reference to FIG. 1. However, operation of each component unit of the tamper detection unit 7 is slightly different from that of Embodiment 1.

Specifically, according to Embodiment 2, the dividing-size determining unit 12 determines a plurality of block sizes BS. The dividing unit 13, the first conversion unit 14, and the second conversion unit 15 generate a plurality of pieces of authentication data correspondingly to the respective block sizes. The resulting plurality of pieces of authentication data are stored by the storage unit 16 to the authentication data list. The judging unit 17 selects one of the plurality of pieces of authentication data from the authentication data list based on the process statuses and informs the block size corresponding to the thus selected piece of authentication data to the dividing unit 13. Further, the tamper detection request unit 6 operates slightly differently from that described in Embodiment 1.

The following describes the process of authentication data generation and comparative data generation, with the focus on the differences with Embodiment 1.

2.1. Authentication Data Generation

Figure 7:
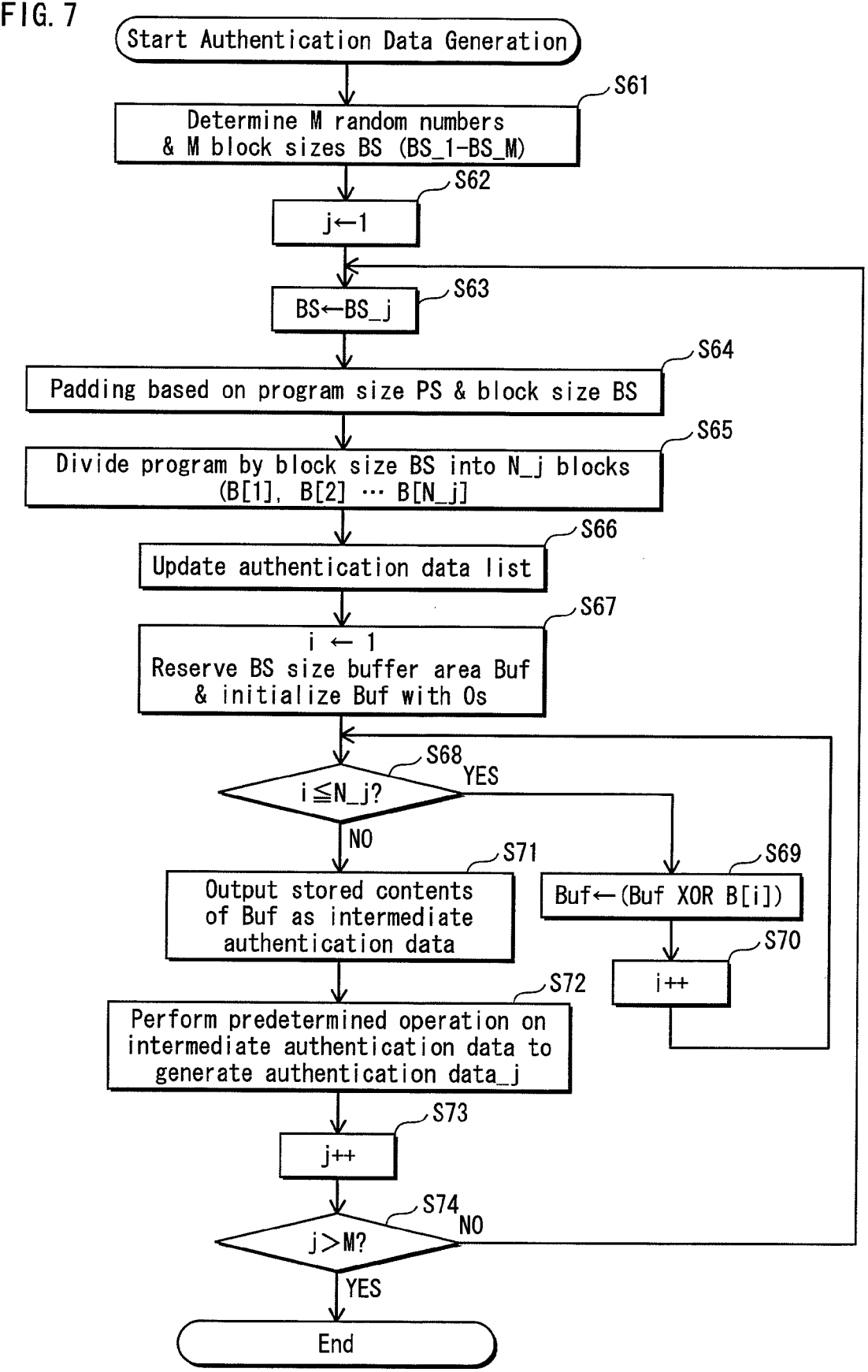
FIG. 7 is a flowchart of an authentication data generating process according to Embodiment 2 of the present invention.

The following describes the processing of authentication data generation according to Embodiment 2, with reference to FIG. 7.

The processing steps shown in FIG. 7 are mostly common with the processing steps shown in FIG. 4, except for those relating to the block splitting and the first and second data conversions.

In view of this, the following mainly describes the processing steps that are different from those described with reference to FIG. 4.

First, the tamper detection request unit 6 transmits a request for generating authentication data to the dividing-size determining unit 12 via the I/O unit 11. The request transmitted herein includes a program identifier.

The processing up to this point is the same as that of Embodiment 1.

Upon receipt of the authentication data generation request, the dividing-size determining unit 12 generates M random numbers.

Here, M is a predetermined natural number and M=4 in this embodiment. Alternatively, however, M may be generated randomly and stored in advance within the tamper detection device.

The tamper detection request unit 6 then determines a plurality of block sizes correspondingly to the respective M random numbers (BS_1-BS_M) (Step S61).

The processing steps for determining a block size based on a corresponding random number are the same as those of Embodiment 1.

The dividing-size determining unit 12 then transmits, to the dividing unit 13, a dividing instruction containing the program identifier, the plurality of block sizes (BS_1-BS_M), and the generation data type indicating authentication data.

Upon receipt of the dividing instruction, the dividing unit 13 reads from the flash memory 3 the program identified by the program identifier contained in the received dividing instruction. Next, the dividing unit 13 reads from the authentication data list 23 the program size PS corresponding to the program identifier.

The dividing unit 13 initializes an internal variable j to "1" (Step S62) and lets BS_j to be the current block size BS (Step S63).

The following processing Steps S64-S72 are the same as Steps S22-S30 described above.

Note, however, that N used in Embodiment 1 is replaced by N_j in Embodiment 2.

Further, the number of blocks to be obtained by the block splitting is equal to N in Embodiment 1 but to N_j in Embodiment 2.

Still further, the authentication data in Embodiment 1 is replaced with authentication data_j in Embodiment 2.

Still further, the authentication data list generated by the dividing unit 13 in Step S66 is different from the authentication data list generated in Embodiment 1.

FIG. 8 is a view showing one example of an authentication data list 81 generated by the dividing unit 13 in Step S66.

As shown in FIG. 8, the authentication data list 81 contains four different block sizes and four different pieces of authentication data all corresponding to the one program identified by the program identifier "0001".

With reference to the authentication data list 81 shown in FIG. 8, the column of block size 85 contains four block sizes, which are 1 KB, 4 KB, 6 KB, and 20 KB. These are examples of BS_1-BS_M described above.

More specifically, BS_1=1, BS_2=4, BS_3=6, and BS_4=20. Note that these examples are given provided that M=4.

In Step S66, each time the dividing unit 13 performs the block splitting process based on the block size BS_j, the dividing unit 13 additionally stores the value of BS_j to a corresponding field in the column of block size 85.

In Step S72, the storage unit 16 adds a piece of authentication data_j generated by the second conversion unit 15, to a field in the column of authentication data 86 corresponding to BS_j.

In Step S73 that follows, the dividing unit 13 increments j (Step S73).

If j is greater than M (Step S74: YES), the processing ends.

On the other hand, if j is not greater than M (Step S74: NO), the processing steps from Step S63 onward are repeated.

This concludes the description of FIG. 8.

2.2. Comparative Data Generation and Tamper Detection

2.2.1. Additional Functions of Tamper Detection Request Unit 6

In Embodiment 2, at the time of a tamper detection process, one piece of authenticator data is selected from among M pieces of authentication data (four pieces in this embodiment) stored in the authentication data list 81. Comparative data is calculated to be compared with the selected piece of authentication data to detect tampering with the target program.

The piece of authentication data to be compared in the tamper detection process is selected in accordance with the process status value that is calculated based on the status of each process currently running. The details of the process status value will be given later.

Note that the tamper detection request unit 6 according to Embodiment 2 has additional functions as compared with Embodiment 1 so to be able to generate a process status value.

More specifically, the tamper detection request unit 6 according to this embodiment has a function of monitoring the process status.

Figure 9:
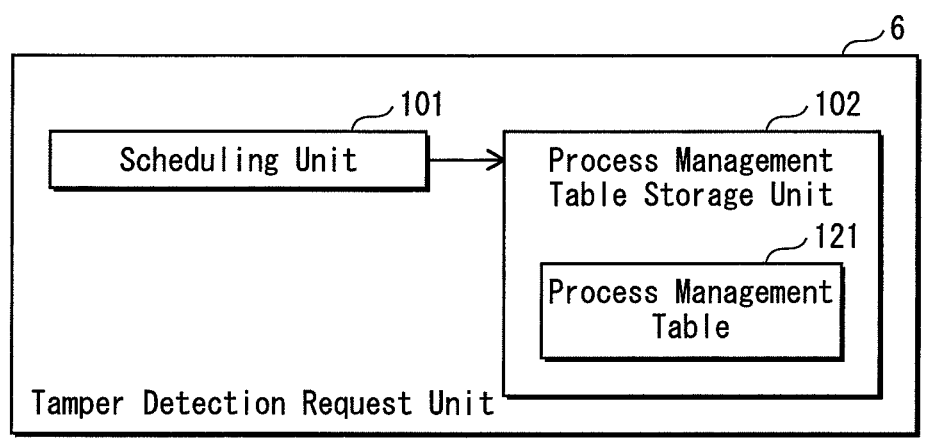
FIG. 9 is a schematic view of a tamper detection request unit according to Embodiment 2 of the present invention.

FIG. 9 is a schematic view of the tamper detection request unit 6 according to Embodiment 2, with the focus on the additional elements to Embodiment 1.

The tamper detection request unit 6 has the functions described in Embodiment 1 and additionally includes a scheduling unit 101 and a process management table storage unit 102. The scheduling unit 101 manages a plurality of processes that can be executed in parallel by switching between them. The process management table storage unit 102 stores process information indicating the priority levels and CPU utilization percentages of the plurality of processes.

The process management table storage unit 102 stores a process management table.

Figure 10:
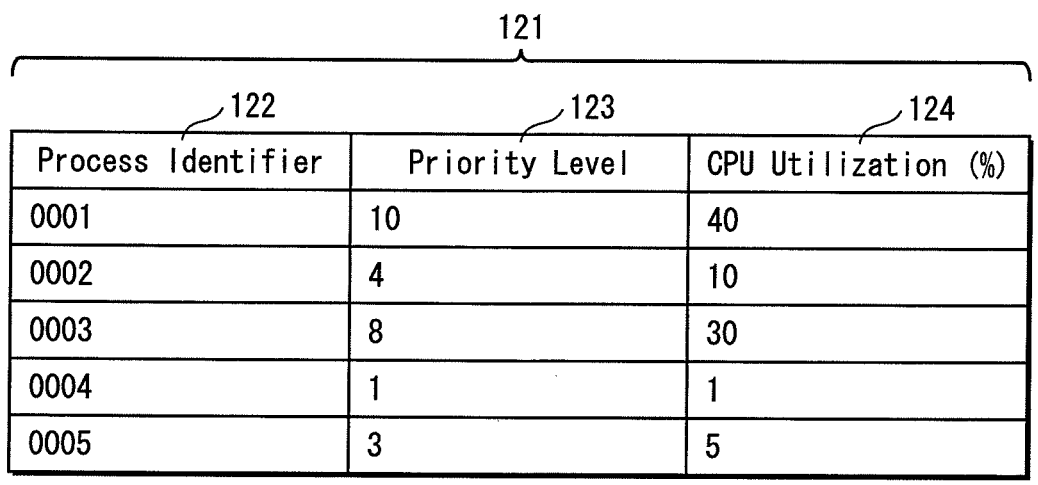
FIG. 10 is a view showing one example of a process management table stored in a process management table storage unit according to Embodiment 2 of the present invention.

FIG. 10 shows one example of the process management table 121 stored in the process management table storage unit 102.

The process management table 121 is composed of columns of a process identifier 122, a priority level 123, and a CPU utilization percentage 124.

Each process identifier 122 is a process ID identifying a process currently running.

Each priority level 123 is a priority level assigned to the process identified by a corresponding one of the process identifiers 122.

Each CPU utilization percentage 124 is a value indicating the percentage of CPU used by the process identified by a corresponding one of the process identifiers 122.

In the example shown in FIG. 10, the process management table 121 has five entries of processes.

As shown in FIG. 10, the process management table 121 indicates that the process identified by the process identifier "0001" has the priority level "10" and the CPU utilization percentage "40%". Similarly, the processes identified by the process identifiers "0002", "0003", "0004" and "0005" have the priority levels "4", "8", "1", and "3", respectively and also have the CPU utilization percentages "10%", "30%", "1%", and "5%", respectively.

Note that the process management table is generated and sequentially updated by the execution unit 5 as needed.

2.2.2. Generation of Process Status Value

Figure 11:
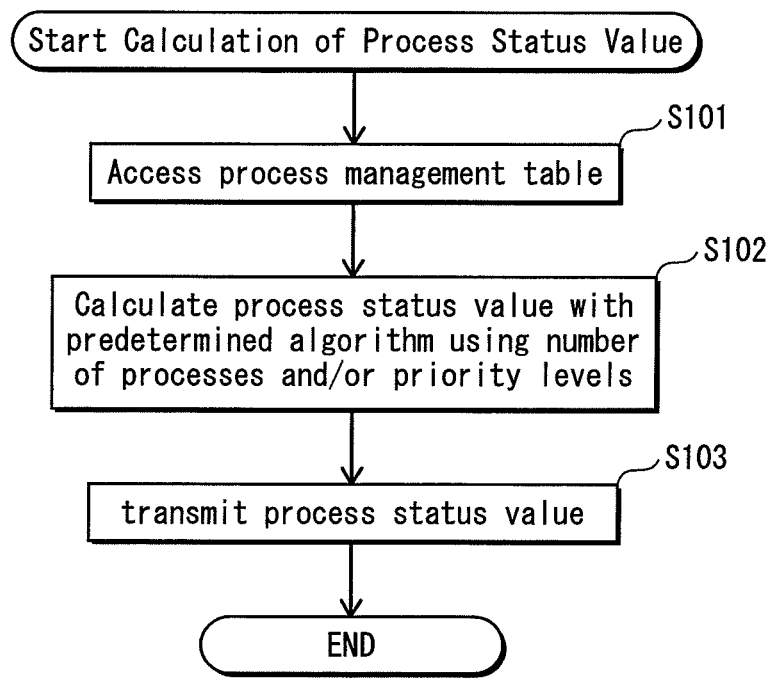
FIG. 11 is a flowchart of a process of generating a process status value by a scheduling unit according to Embodiment 2 of the present invention.

With reference to FIG. 11, the following describe the process of generating a process status value, performed by the scheduling unit 101 with the use of information stored in the process management table 121.

First of all, the scheduling unit 101 reads the process management table 121 from the process management table storage unit 102 (Step S101).

Next, the scheduling unit 101 calculates a process status value by a predetermined algorithm with the use of information contained in the process management table 121 (Step S102).

In this example, the predetermined algorithm is to calculate the number of processes contained in the process management table and designates the calculated number of processes as the process status value.

In the example shown in FIG. 10, the process management table 121 has five entries of processes identified by the process identifiers "0001" to "0005".

Thus, the scheduling unit 101 calculates the process status value of "5" by the above algorithm.

Next, the scheduling unit 101 transmits the process status value calculated in Step S102 to the I/O unit 11 of the tamper detection unit 7 (Step S103).

Upon receipt of the process status value, the I/O unit 11 transmits the received process status value to the judging unit 17.

2.2.3. Authentication Data Selection and Tamper Detection

The processing steps subsequent to the transmission of the process status value by the I/O unit 11 are described with reference to FIG. 12.

Figure 12:
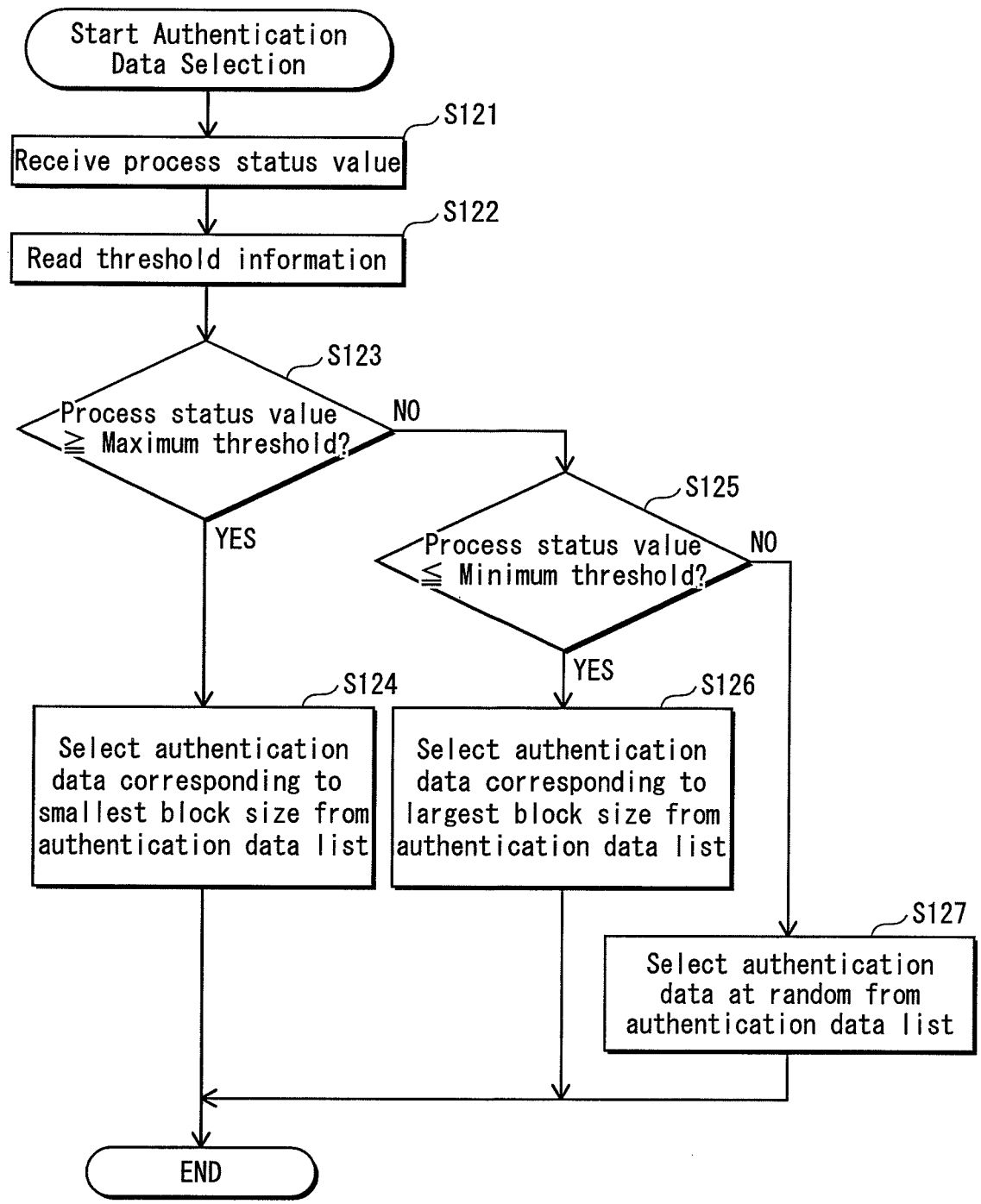
FIG. 12 is a flowchart of a process of selecting a piece of authentication data based on a process status value, according to Embodiment 2 of the present invention.

FIG. 12 is a flowchart of operation of selecting a piece of authentication data based on a process status value.

First of all, the judging unit 17 receives a process status value prior to the time of initiating comparative data generation (Step S121).

The judging unit 17 in this embodiment has stored in advance threshold information composed of a pair of maximum and minimum thresholds. The threshold information is used for selecting authentication data and compared against the process status value.

Next, the judging unit 17 reads the threshold information (Step S122) to judge whether the process status value is equal to or greater than the maximum threshold (Step S123).

When the process status value is equal to or greater than the maximum threshold (Step S123: YES), the judging unit 17 selects a piece of authentication data that corresponds to the smallest block size, from among the plurality of pieces of authentication data contained in the authentication data list 81 (Step S124).

In the example of the authentication data list 81 shown in FIG. 8, the judging unit 17 selects the piece of authentication data_1 corresponding to the smallest block size 1 KB.

On the other hand, if the process status value is smaller than the maximum threshold (Step S123: NO), the judging unit 17 further judges whether the process status value is equal to or less than the minimum threshold (Step S125).

If the process status value is smaller than the minimum threshold (Step S125: YES), the judging unit 17 selects the piece of authentication data that corresponds to the largest block size, from among the plurality of pieces of authentication data contained in the authentication data list 81 (Step S126).

In the example of the authentication data list 81 shown in FIG. 8, the judging unit 17 selects the piece of authentication data_4 corresponding to the smallest block size of 20 KB.

In the case where the minimum threshold<the process status value<the maximum threshold (Step S125: NO), the judging unit 17 randomly selects one of the plurality of pieces of authentication data contained in the authentication data list 81 (Step S127).

Through the above processing steps, one of the plurality of pieces of authentication data is selected.

Once a piece of authentication data is selected, the judging unit 17 reads the program address 83, program size 84, and block size 85 corresponding to the selected piece of authentication data from the authentication data list 81.

Then, comparative data is calculated using the thus obtained pieces of information and compared with the authentication data to detect tampering with the target program.

The processing steps of calculating the comparative data and of comparing the comparative data with the authentication data are the same as those described in Embodiment 1.

With the above described arrangement, Embodiment 2 of the present invention employs a process status value to adjust the load imposed by the tamper detection process. This advantage enables to perform the tamper detection process on one program in a manner to suppress influence on other processes as much as possible.

3. Other Modifications

Up to this point, the present invention has been described by way of the above embodiments. However, it should be naturally appreciated that the present invention is not limited to those specific embodiments and various modifications including the following still fall within the scope of the present invention.

(1) In the above embodiments, the RAM 2 is described as random access memory but without intention to limit the scope of the invention. Any type of readable and writable memory is usable. Further, the flash memory 3 is described as Flash ROM but without intention to limit the scope of the invention. Any non-volatile memory such as EEPROM (Electrically Erasable Programmable ROM) and HDD (Hard Disk Drive) may be usable.

(2) In the above embodiments, the program identifier is described as ID information identifying a corresponding program but without intention to limit the scope of the invention. Any other information, such as a process ID or a file name, identifying a corresponding program may be usable.

(3) In the above embodiments, the block size is described to be determined by using a random number directly as it is, but without intention to limit the scope of the invention. The block size may be determined by any other way as long as the determination is made more or less at random.

For example, a table showing random numbers in one-to-one correspondence with block sizes may be stored in advance. The dividing-size determining unit 12 then determines a block size by selecting one of the block sizes corresponding to the generated random number from the table.

In another example, a predetermined number (five, for example) of candidate block sizes may be prepared in advance. The dividing-size determining unit 12 then determines a block size by selecting one of the candidate block sizes in rotation.

(4) In the above embodiments, the padding process is described to be conducted on the target program prior to the block splitting. Alternatively, however, the padding process may be conducted on the last one of the blocks obtained by dividing the target program. In this case, the block B[16] before padding is a 2 KB block.

Further, the padding process per se may be omitted. In this case, the number of bits contained in the block B[16] falls short of the number of bits contained in data stored in Buf.

In order to address this shortage, as far as the block B[16] is concerned, the XOR operation may be conducted by comparing only part of the data stored in Buf with the block B[16] to generate ultimately intermediate authentication data 63. Alternatively, the XOR operation may be conducted on the blocks up to B[15] but not on the block B[16] to generate intermediate authentication data 63.

(5) In the above embodiments, the tamper detection is described to be conducted on the entire target program but without intention to limit the scope of the invention. A modification may be made to conduct tamper detection on part of the target program.

In this case, the program address 42 described above needs to be changed to the starting address of the part of the program targeted for tamper detection. Similarly, the program size 43 contained in the authentication data list 23 needs to be changed to the program size of the target part of the program.

With the above modification, the tamper detection may be conducted on part of the target program, so that the time required for the tamper detection is further reduced. This modification is especially effective in the case where the target program is extremely large so that even the process of generating intermediate authentication data may take long.

A yet another modification may be made to conduct tamper detection on a plurality of parts of a single program. In this case, the authentication data list is made to store a plurality of program addresses 42, program sizes 43, block sizes 44, and pieces of authentication data 45 all associated with the same program identifier.

With this modification, the tamper detection is conducted separately on each of a plurality of program segments of a single program.

A yet another modification may be made to conduct the tamper detection on a plurality of programs residing on the RAM 2 as a result of loading one and the same program a plurality of times from the flash memory 3. In this case, the authentication data list is made to store a plurality of program addresses 42, program sizes 43, block sizes 44, and pieces of authentication data 45 all associated with the same program identifier.

Note, however, that the plurality of program sizes 43 all uniformly indicate the program size of the entire program and not of a part of the program.

(6) In the above embodiments, no specific description is given of the process of selecting one of a plurality of programs as a target program upon occurrence of a tamper detection trigger. The following are examples of the selecting process.

In one example, the judging unit 17 may randomly select one of the programs residing on the flash memory 3 as a program targeted for the tamper detection.

In another example, the tamper detection request unit 6 may receive from an external device a selection result indicating one of the plurality of programs. Upon receipt of the selection result, the tamper detection request unit 6 transmits to the tamper detection unit 7 an authentication data generating request that contains the program identifier identifying the selected program.

In yet another example, an interrupt may be timely generated for initiating the tamper detection and the process being executed at the time of interruption is selected as the target program.

In this case, during the time the execution unit 5 is executing one or more programs residing on the RAM, the tamper detection request unit 6 generates an interrupt to the execution unit 5, acquires the value of a program counter at that time, and transmits the program counter value to the I/O unit 11. In response, the I/O unit 11 transmits the received program counter value to the judging unit 17. The judging unit 17 then reads program information stored at the address corresponding to the received program counter value, with reference to the corresponding program address and program size contained in the authentication data list 23.

Regarding the timing at which the tamper detection request unit 6 issues a comparative data generation request to the I/O unit 11 to initiate the tamper detection, the following modifications may be made. For example, the tamper detection request unit 6 may periodically issues a comparative data generation request. In another example, each program residing on the RAM 2 may be embedded with a process of transmitting to the tamper detection request unit 6 an authentication data generation request and a tamper detection request, so that the tamper detection is initiated upon occurrence of a predetermined event.

(7) A threshold may be set to the block size to be determined by the dividing-size determining unit 12, so that the dividing-size determining unit 12 determines the block size that is equal to or smaller than the threshold. As a result, the size of data ultimately generated by the first conversion unit 14 is randomly selected but always limited to the threshold at maximum. This ensures to limit the time required for the process by the second conversion unit 15 to a predetermined time or shorter, regardless of the size of the target program.

(8) According to the above embodiments, the first conversion unit 14 is described to convert data by conducting the XOR operation and the second conversion unit 15 is described to convert data by conducting b the SHA1 process. However, these are described by way of example and without limitation. The respective conversion units may instead use an algorithm of a combination of logical operations or a one-way function.

One example of such an algorithm of a combination of logical operations is to alternately conduct a logical AND operation and an exclusive OR operation.

The following specifically describes an example in which the first conversion unit 14 uses the above algorithm. First of all, the first conversion unit 14 conducts the logical AND operation between data blocks B[1] and B[2] and then conducts the exclusive OR operation between the result of the logical AND and the data block B[3]. The first conversion unit 14 then conducts the logical AND operation between the result of the exclusive OR operation and the data block B[4]. In this way, the first conversion unit 14 alternately conducts the exclusive OR operation and the logical AND sequentially between the result of the previous logical operation and the subsequent data block.

Further, it may be possible to conduct the logical AND operation and the exclusive OR operation at the ratio of 2:1 or any other ratio, rather than 1:1 as in the above example.

In the case where the ratio should be 2:1, the first conversion unit 14 first conducts the logical AND between the data blocks B[1] and B[2], followed by another logical AND operation between the result obtained by the previous logical AND operation and the data block B[3]. After successively conducting the logical AND operation two times, the first conversion unit 14 then conducts the exclusive OR operation between the result of the immediately previous logical operation and the data block B[4]. After conducting the exclusive OR operation one time, the first conversion unit 14 now conducts the logical AND operation between the result of the immediately previous logical operation and the data block B[5]. In this manner, the first conversion unit 14 conducts the exclusive OR operation each time after conducting the logical AND operation two times in a row.

By implementing either or both the conversion units to conduct a combination of different logical operations at a ratio determined at random, the algorithm used by the corresponding conversion unit reduces the processing load and adds randomness.

In the case where the first conversion unit 14 and the second conversion unit 15 both use a one-way function, it is desirable that the respective conversion units use mutually different one-way functions. For example, the first conversion unit 14 which aims to reduce the data amount may employ a one-way function with a relatively light load, whereas the second conversion unit 15 which aims to generate authentication data employs a one-way function with a relatively high security level.

Further, by conducting the first data conversion on the entire target program rather than part of the target program, tampering with any part of the entire target program is fully checked. In other words, even if one bit of the target program is tampered with, the tampering is reliably detected.

(9) In the above embodiments, one piece of authentication data is generated from one target program. Alternatively, however, one piece of authentication data may be generated from a plurality of target programs.

The following specifically describes a modification according to which only one piece of authentication data is generated from a plurality of target programs. In this case, a plurality of target programs are concatenated into a single piece of data targeted for tamper detection. The dividing unit 13 conducts the above-described block splitting process on the target data and then the first data conversion unit 14 conducts the above-described XOR operation sequentially on the resulting data blocks generated by dividing the target data. Here, the conversion by the first conversion unit 14 may be such a process that the resulting intermediate authentication data varies depending the order of the concatenated programs. With this arrangement, it is made more difficult to analyze the authentication data without knowing the order of the concatenated target programs.

Note that in the case where the first conversion unit 14 generates different intermediate authentication data, it is naturally necessary to make sure to generate comparative data from the data into which corresponding target programs are concatenated in the same order. In view of this, the concatenated order of the programs needs to be registered together with the authentication data.

In another modification, one piece of authentication data is generated from a plurality of target programs without concatenating the target programs. According to this modification, the block splitting process by the dividing unit 13 and the intermediate authentication data generating process by the first conversion unit 14 are looped as many times as the number of target programs.

In this case, the storage unit 16 stores, to the flash memory 3, information indicating that the piece of authentication data corresponds to the plurality of target programs.

This arrangement is effective to reduce the number of pieces of authentication data to save the memory space.

(10) According to Embodiment 1 described above, the dividing unit 13 divides the target program by the block size determined by the dividing-size determining unit 12. The first conversion unit 14 then conducts the process on the plurality of blocks obtained by dividing the target program, to output a piece of data that is equal to the block size. However, this is not intended to limit the scope of the invention.

The processes by the dividing-size determining unit 12, the dividing unit 13, and the first conversion unit 14 may be replaced with other processes through which the loaded program is reduced, before it is supplied to the second conversion unit 15, to a size that is determined at random at the time of the program loading. With this modification, the effects described in Embodiment 1 are still achieved.

(11) According to Embodiment 2 described above, the number of the block sizes M is determined in advance and stored in the dividing-size determining unit 12. However, this is not intended to limit the scope of the invention.

Alternatively, for example, the value of M may be determined according to a user operation and the tamper detection request unit 6 informs the value of M as determined to the dividing-size determining unit 12.

In another example, the value of M may be determined according to the number of pieces of authentication data that the flash memory 3 is capable of storing.

(12) In Embodiment 2 described above, one of a plurality of pieces of authentication data each corresponding to a different one of the block sizes is selected according to the process status value. Alternatively, the authentication data selection may be made at random. As a consequence, the size of comparative data to be generated is equal to the size randomly selected from among the plurality of block sizes corresponding to the plurality of pieces of authentication data. This randomness makes it even more difficult for an unauthorized third party to analyze the comparative data.

(13) According to the above embodiments, the authentication data list is described to be stored on the flash memory 3 and in the form of plaintext. In order to further increase the security, the authentication data list may be stored to a tamper-resistant memory such as secure flash memory.

Further, the authentication data list may be stored to a storage device other than the flash memory 3.

For example, the storage unit 16 may be provided with a small capacity secure memory to store the authentication data list.

(14) In addition, the tamper detection unit 7 may be provided with an encryption/decryption unit and an encryption key, so that the authentication data list is encrypted with the encryption key and stored in encrypted form.

In order to refer to or add data to the authentication data list, the encrypted authentication data list needs to be decrypted by the encryption/decryption unit with the use of the encryption key both provided within the tamper detection unit 7. In order to store the authentication data list back, the authentication data list needs to be encrypted by the encryption/decryption unit with the use of the encryption key.

With this modification, the authentication data list is stored securely, so that the block size BS is more reliably protected against analyses by an unauthorized third party.

(15) According to the above embodiments, the authentication data list is described to be generated by the tamper detection unit 7 dynamically at the time when the target program is loaded from the flash memory 3 to the RAM 2. However, this is not intended to limit the scope of the invention and the authentication data list may be stored in advance on the storage unit 16 or the flash memory 3.

With this arrangement, it is not necessary to dynamically generate authentication data from the target program residing on the flash memory 3 at the time when the program is loaded. Instead, tampering with the program residing on the RAM is detected with the use of the authentication data list stored in advance on the storage unit 16 or the flash memory 3. As a result, the processing load imposed at the time of program loading is reduced. In this modification, however, in order to address the risk of tampering with the authentication data list, it is preferable to protect the storage unit 16 or the flash memory 3 storing the authentication data list by, for example, making it tamper-resistant.

Further, the tamper detection may be conducted on the target program residing on the flash memory 3 using the authentication data list that is stored in advance on the storage unit 16 or the flash memory 3. With this modification, the tamper detection is conducted on the target program residing on the flash memory 3 and also on the target program residing on the RAM 2.

(16) In the case where the target program is converted into a different data format during the loading from the flash memory 3 to the RAM 2, the authentication data list may contain authentication data generated from the target program in the converted data format. This modification enables the tamper detection to be dully conducted on the target program residing on the RAM even if the target program is stored on the flash memory in compressed format and decompressed at the time when the program is loaded to the RAM for execution.

(17) The tamper detection device 1 may be additionally provided with a transmission unit for receiving and transmitting data between an external terminal. With the use of the transmission unit, the tamper detection device 1 receives a new authentication data list to update the previously stored authentication data list. Since the authentication data list is updated, the security is further improved.

(18) The tamper detection device 1 may be additionally provided with a storage medium reading unit for reading data stored on a storage medium. With the use of the storage medium reading unit, the tamper detection device 1 reads a new authentication data list stored in the storage medium and updates the previously stored authentication data list with the new authentication data list. Since the authentication data list is updated, the security is further improved.

(19) In the above embodiments, execution of the target program by the execution unit 5 is made to stop upon detecting an tampering with the target program. However, this is given merely by way of example and without limitation. Alternatively to stop the execution, the program execution may be interrupted by any other means. For example, a warning display may be presented, restrictions may be imposed on the program execution time, or part of the program function, such as data storage, may be disabled.

Alternatively, the tamper detection device may be so designed that the load unit 4 re-loads a program corresponding to the target program from the flash memory 3 if any tampering with the target program being executed is detected.

With this modification, if the target program residing on the RAM 2 is found to contain an unauthorized alteration, a program corresponding to target program but without alterations is loaded and executed to ensure the security of the program execution.

A further modification may be made to keep log information indicating that tampering with the target program is detected, on nonvolatile memory. With the log information, after the manufacturer of terminals recall their defective terminals, they are able to know which program has been tampered with.

If the terminal acting as the tamper detection device is provided with a network connection function, the tamper detection device may be modified to transmit log information indicating that tampering with a program is detected to a server via a network. With this modification, the server is allowed to know which program has been tampered with.

A further advantage of this modification is to distribute an updated version of the target program prepared by appropriately addressing problems noted based on the log information.

(20) The tamper detection device 1 or the tamper detection unit 7 described above may be implemented as a secure execution environment. Examples of a secure execution environment include a Trusted Platform Module (TPM) and Mobile Trusted Module (MTM) both based on the specification developed by the Trusted Computing Group (TCG). With this arrangement, all the component units of the tamper detection device 1 or the tamper detection unit 7 are implemented in a secure environment to further improve the security of the execution environment.

(21) In the above embodiments, the first conversion unit 14 outputs, as the processing result, a piece of data that is equal in size to the block size BS. Yet, the size of output data is not limited to this size. Although the first conversion unit 14 according to the above embodiments output, as a result the conversion processing, data that is equal to the block size BS, the size of output data may be determined independently of the block size BS.

The following briefly describes how this example is implemented.

The dividing-size determining unit 12 determines the block size BS as well as the output data size of the conversion process both at random, and informs the thus determined output data size to the first conversion unit 14.

The first conversion unit 14 converts a target program in a manner to reduce the data size to be equal to or smaller than the determined output data size. In addition, the data output data size of the conversion process is additionally stored to the authentication data list.

To generate comparative data, the first conversion unit 14 converts a target program in a manner to reduce the data size to be equal to or smaller than the determined output data size that is indicated by the authentication data list The subsequent processes are continued on the resulting data.

(22) According to the above embodiments, the target program is divided into a plurality of blocks by the block size BS that is determined at random, and the XOR operation is conducted sequentially on the plurality of blocks. As a result, randomness is added to the process of reducing the data amount. By virtue of the randomness, it is more difficult to attempt a malicious attack against the data reduction process. Yet, this is merely one example and the randomness may be imparted by another way.

For example, a plurality of algorithms usable to reduce the data amount may be provided and one of the algorithms to be actually used may be determined at random.

One specific example of such an algorithm is a logical operation other than XOR, such as AND taken between the blocks. Another example is an algorithm of calculating the checksum of the entire target program. Both the examples are a conversion using a relatively lightweight function.

Specifically, the above modification is implemented in the following manner. In the process of authentication data generation, information identifying the conversion process used to reduce the data amount is stored to the authentication data list. In the process of comparative data generation, the algorithm used to generate the authentication data is identified with reference to the authentication data list. The thus identified algorithm is used to convert a target program to reduce the data amount and then the second conversion unit 15 conducts processing on the resulting data.

By determining the algorithm at random, an adequate level of protection against a malicious attack is provided although either or both of the block size and the output data size of the conversion process are fixed. It goes without saying that the above-mentioned sizes may be determined at random to further improve the security.

(23) In the above embodiments, the same set of the dividing unit 13, the first conversion unit 14, and the second conversion unit 15 is used to generate both authentication data and comparative data. However, it is applicable to provide separate sets of the respective units for generating authentication data and comparative data.

(24) According to Embodiment 2, the process management table 121 contains the process identifier 122. However, this is not of limitation. Any other information usable to identify a corresponding process may be employed and a program identifier is one example of such information.

(25) According to Embodiment 2, the algorithm used to determine the process status value determines the number of processes directly as the process status value. However, this is not intended to limit the scope of the invention.

In another example of the algorithm, the total percentage of CPU utilization by the processes registered in the process management table storage unit 102 is calculated and the thus calculated total percentage of CPU utilization is determined as the process status value.

FIG. 10 shows one example of the process management table 121 according to this modification. In the example shown in FIG. 10, the percentages of CPU utilization by the respective processes identified by the process identifiers "0001" to "0005" are 40%, 10%, 30%, 1%, and 5%. Thus, the total percentage of CPU utilization is calculated to be 86%. Thus, the process status value is determined to be "86".

In another example of the algorithm, the sum of the products calculated for each process by multiplying the corresponding CPU utilization percentage by the corresponding priority level is determined to be the process status value.

With reference to the example of the process management table 121 shown in FIG. 10, the result of the algorithm is calculated to be "696" as follows.

$10 \times 40$ (process identifier "0001":

priority level $\times CPU$ utilization percentage) +

$4 \times 10$ (process identifier "0002": priority level $\times$ $CPU$ utilization percentage) +

$8 \times 30$ (process identifier "0003": priority level $\times$ $CPU$ utilization percentage) +

$1 \times 1$ (process identifier "0004": priority level $\times$ $CPU$ utilization percentage) +

$3 \times 5$ (process identifier "0005": priority level $\times$ $CPU$ utilization percentage) = 696

Note that the algorithms described above are merely examples and other algorithms are applicable as well.

(26) In Step S127 of Embodiment 2, a piece of authentication data is selected at random from among all the pieces of authentication data contained in the authentication data list 81. However, this is not intended to limit the scope of the invention.

For example, the random selection may be made from the plurality of pieces of authentication data contained in the authentication data list 81, excluding those pieces corresponding to the minimum and maximum block sizes.

With reference to the example of the authentication data list 81 shown in FIG. 8, a piece of authentication data is randomly selected from among authentication data_2 and authentication data_3.

(27) The above embodiments are described on precondition that relocation is not needed for the target program. Here, relocation refers to the process of replacing symbolic references in an object file with absolute memory addresses. In general, the codes contained in an object file are generated on assumption that the codes start at the address zero. Once the actual location of the program is known, the codes are adjusted to refer to the actual addresses before the program executes.

Figure 13:
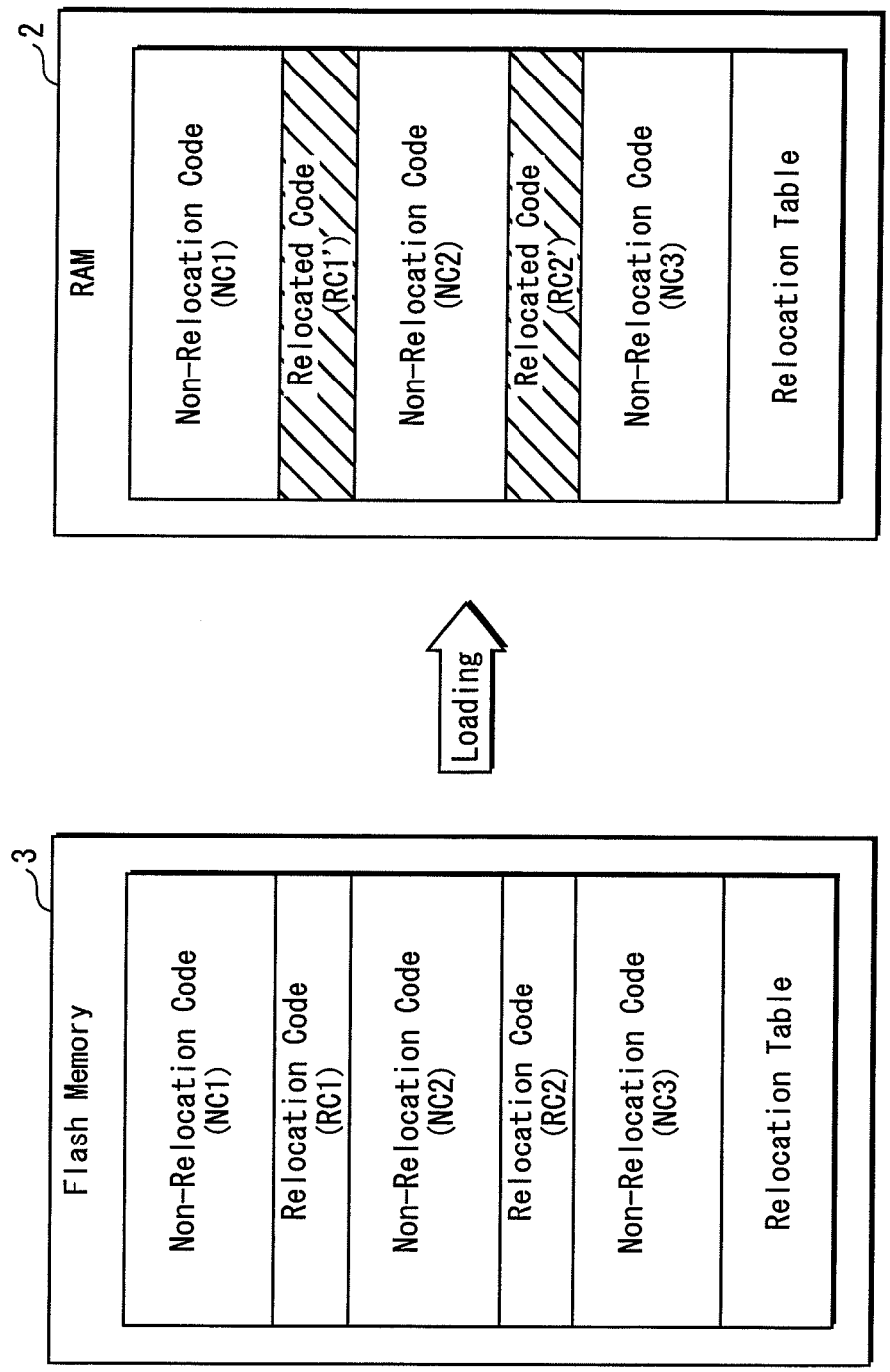
FIG. 13 is a view illustrating a program containing a relocation code according to a modification of the present invention.

The following specifically describes the relocation process, with reference to FIG. 13. The flash memory 3 stores a program to be loaded as shown in FIG. 13.

The program is composed of non-relocation codes (NC1-NC3), relocation codes (RC1-RC2), and a relocation table.

Non-relocation codes are codes without the need for relocation and remain exactly the same before and after the program is loaded to RAM.

On the other hand, relocation codes are those requiring location. As described above, symbolic references contained in the relocation codes are replaced with absolute addresses during the loading of the program. Thus, the program loaded to the RAM and the program residing on the flash memory 3 differs with respect to those parts subjected to the replacement.

Note that the relocation table contains information necessary to perform relocation. The relocation table remains the same before and after the program loading to the RAM.

The program loaded to the RAM contains the non-relocation codes (NC1-NC3), relocated codes (RC1'-RC2'), and the relocation table.

That is, the program before loading and the program after loading inevitably differ between the relocation codes and the relocated codes.

Consequently, the following inconvenience arises if authentication data is generated from the program before loading and comparative data is generated from the program after the loading as in the above embodiments. That is, the authentication data always disagrees with the comparative data, so that it is always judged that the program has been tampered with.

Figure 14A:
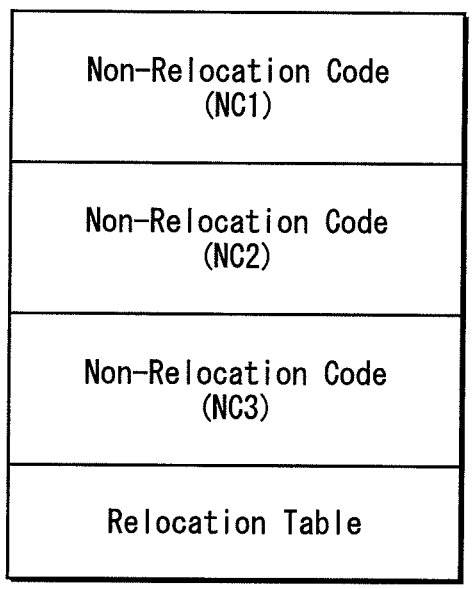
FIG. 14A is a view showing data generated by removing relocation codes from a target program.
Figure 14B:
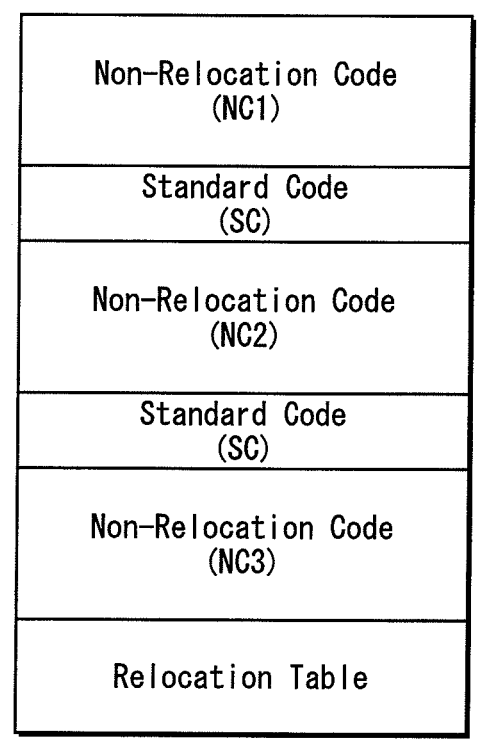
FIG. 14B is a view showing data generated by replacing each relocation code contained in a target program with a standard code.

To eliminate this inconvenience, according to this modification, each target program is processed to be a program as shown in FIG. 14A or 14B and authentication data and comparative data are generated from the corresponding target program processed.

The program shown in FIG. 14A is generated by removing relocation codes from a target program.

The program shown in FIG. 14B is generated by replacing each relocation code contained in a target program with a standard code (SC), which may be a meaningless code such as "0xFFFF . . . ".

This modification obviates the above-noted inconvenience that a program requiring relocation is always judged to have been tampered with.

(28) According to the above embodiments, the dividing-size determining unit 12 generates a random number and determines the block size based on the random number. Since the block size is changed each time a program is loaded, authentication data generated by the loaded program involves randomness to make it more difficult to analyze the authentication data. Yet, these embodiments are without limitation and modifications including the following may be made.

According to this modification, authentication data is generated not from the entire target program but from part of the target program.

In the following example, the part of the target program used to generate authentication data is determined based on a random number.

FIG. 15 is a view illustrating an overview of authentication data according to this modification.

In FIG. 15, a program 21 is a target program for tamper detection.

The tamper detection unit 7 generates two random numbers, for example. One of the random numbers is used as an offset 141 from the starting address of the program and the other is used as a data size 142.

The tamper detection unit 7 then generates authentication data from a data segment 144 that is equal to the data size 142, starting at an address 143 calculated by adding the offset 141 to the starting address of the target program.

The offset 141 and the data size 142 are stored to the authentication data list.

Then, the SHA1 process is conducted on the data segment 144 to obtain authentication data 145.

To generate comparative data for conducting tamper detection, the tamper detection unit 7 reads the offset 141 and the data size 142 from the authentication data list. Then, the tamper detection unit 7 extracts, from the program residing on the RAM, a segment of data that is equal to the data size 142, starting at the address 143 calculated by adding the offset 141 to the starting address of the target program. Comparative data is generated from the thus extracted data segment in the same manner as the generation of authentication data.

With the above modification, a program segment used to generate authentication data is changed each time the program is loaded. Consequently, a corresponding program segment used to generate comparative data is changed accordingly. That is, randomness is added to the resulting authentication data. By virtue of the randomness, it is made more difficult to analyze authentication data. In addition, since authentication data is generated from part of a program rather than the entire program, the authentication data is generated at a faster processing speed.

(29) According to the above embodiments, the block size BS is random information. However, this is merely by way of example and the following modification may be made.

According to this modification, the key used for HMAC-SHA1 (keyed-Hashing for Message Authentication Code—Secure Hash Algorithm 1) and padding data are made to be random information.

Figure 16:
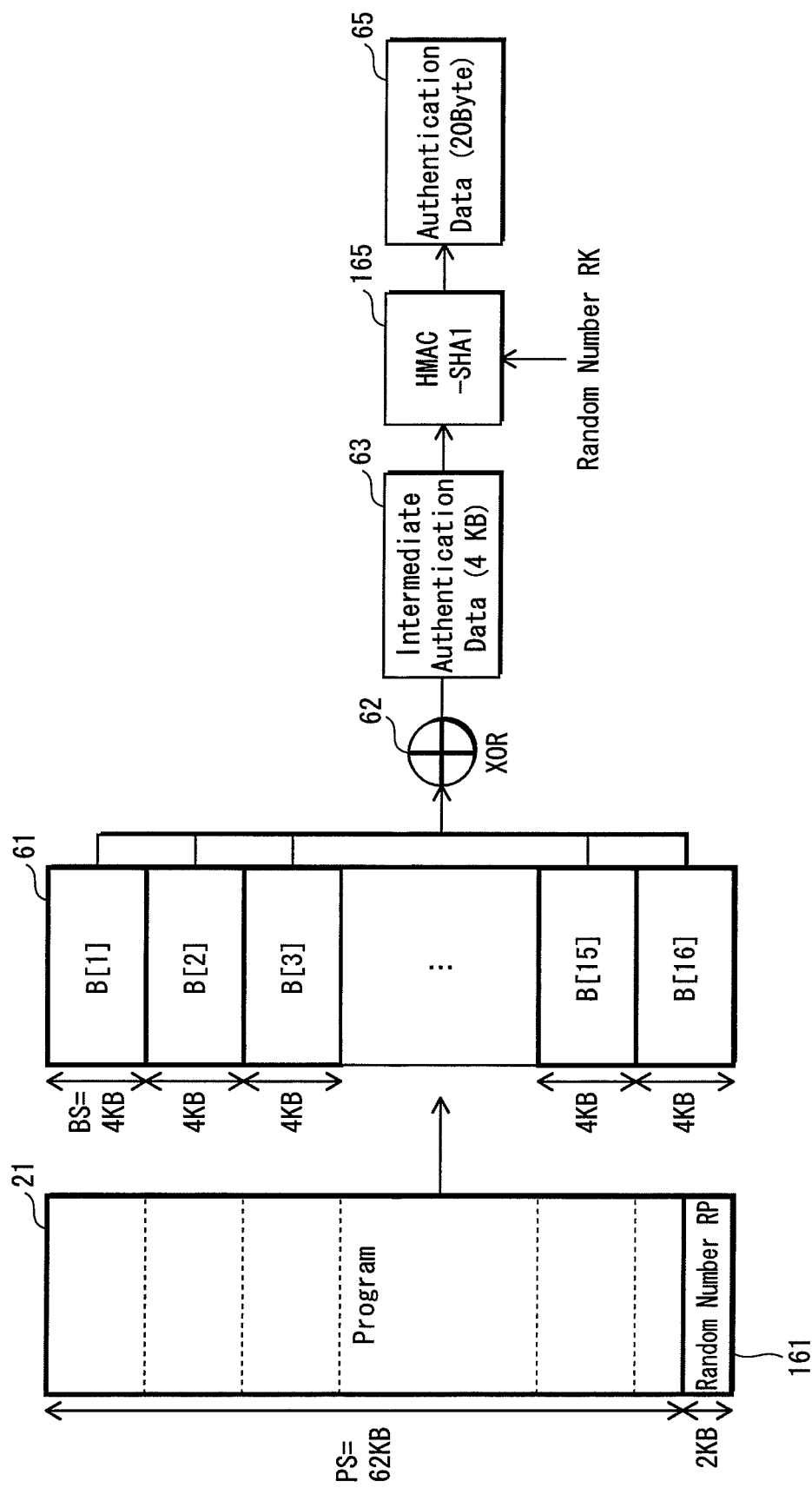
FIG. 16 is a view illustrating changes of data during an authentication data generating process performed with the use of HMAC-SHA1, according to a modification of the present invention.

FIG. 16 is a view illustrating the processing with the use of HMAC-SHA1, according to this modification.

The tamper detection unit 7 generates two random numbers RP and RK.

The two random numbers RP and RK are stored to the authentication data list.

According to the above embodiments, the target program 21 is padded with fixed values such as "0s". According to this modification, however, the program is padded with as many iterations of a random-number RP 161 as shown in FIG. 16.

After the padding, the block splitting is conducted on the padded program, followed by the XOR operation in the same manner as the above embodiments. As a result, intermediate authentication data 63 is obtained.

Then, a HMAC-SHA1 process 165 is conducted on the intermediate authentication data 63 with the use of the random number RK as a key, to obtain authentication data 65.

To generate comparative data, the program residing on the RAM is processed in the same manner as shown in FIG. 16. As a result, comparative data is generated.

According to this modification, two random numbers RP and RK are generated, which means two pieces of random information are used in the processing. However, this is not intended to limit the scope of the invention and it is applicable to use three or more pieces or a single piece of random information. In any case, the effect of increasing the difficulty to analyze authentication data is still achieved.

More specifically, a fixed key may be used instead of a random number RK or padding may be done with a fixed value instead of random number RP.

(30) In the above embodiments, no restrictions are imposed on the possible block sizes to be determined based on a random number. However, it is applicable to place some restrictions on the possible block sizes.

For example, the block size BS may be determined to coincide with the data handling units (such as paging size) on cache memory such as secondary cache of the CPU.

With such restrictions, authentication data and comparative data are generated without the need for replacing data on the cache memory. This arrangement improves the usage efficiency of the cache memory to further improve the speed of the tamper detection process.

(31) In the above embodiments, a plurality of different size pieces of authentication data are generated from one program before the program is loaded. After the program loading, one of the plurality of pieces of authentication data is selected and used in the tamper detection. However, this is not intended to limit the scope of the invention and the tamper detection may be performed using a plurality of pieces of authentication data.

For example, it is applicable to select two or more pieces of authentication data and the tamper detection may be performed using the thus selected two or more pieces authentication data.

In this case, pieces of comparative data are generated in one-to-one correspondence with the selected pieces of authentication data. Then each piece of comparative data is compared against a corresponding piece of authentication data.

In addition, the tamper detection may be performed using two or more pieces of authentication or comparative data that are concatenated or added together.

(32) In the above embodiments, the target program is stored on ROM and executed after being loaded to RAM. However, this is merely by way of example and without limitation. For example, the program may be stored in a hard disk or nonvolatile memory and loaded to memory other than RAM for execution.

(33) Specifically speaking, the device mentioned above is a computer system having a microprocessor, ROM, RAM, a hard disk unit, a display unit, a keyboard, and a mouse. The RAM or hard disk unit stores a computer program. The computer program is composed of a plurality of sets of computer instruction codes to achieve predetermined functionalities. The microprocessor operates in accordance with the computer program, so that the device achieves the predetermined functionalities.

(34) Some or all of the component units of the device described above may be implemented in a single system LSI (Large Scale Integration) circuit. The system LSI is a large scale integrated circuit by fabricating multiple modules on a single chip. Specifically, the system LSI is a computer system composed of a microprocessor, ROM, RAM, and possibly other components. The RAM stores a computer program. The microprocessor operates in accordance with the computer program, so that the system LSI carries out its functionalities.

Some or all of the component units of the device described above may be implemented in separate chips or in a single chip.

Although an LSI is specifically mentioned above, the circuit may be referred to as IC, LSI, super LSI, or ultra LSI, depending on the packaging density. In addition, an integrated circuit may be fabricated not only by way of LSI. For example, it is applicable to use an FPGA (Field Programmable Gate Array) that enables post-manufacturing programming of an LSI circuit. It is also applicable to use a reconfigurable processor that allows reconfiguration of connection between circuit cells within an LSI circuit and their settings.

When any new circuit integration technology becomes available or derived as the semiconductor technology advances, such new technology may be employed to integrate the functional units of the present invention. One possible candidate of such new technology may be achieved by adapting biotechnology.

(35) Some or all of the component units of the device described above may be implemented in an IC card that may be attached to or detached from the device or in a single module. The IC card or module is a computer system composed of a microprocessor, ROM, RAM, and possibly other components. The IC card or module may include the super multifunctional LSI circuit mentioned above. The microprocessor operates in accordance with a computer program stored on the RAM, so that the IC card or module carries out its functionalities. In addition, the IC card or module may be made tamper-resistant.

(36) The present invention may be embodied as any of the methods described above or a computer program for causing a computer to execute such a method. Furthermore, the present invention may be embodies as a digital signal representing such a computer program.

Still further, the present invention may be embodied as a computer-readable recording medium storing the computer program or digital signal mentioned above. Examples of compute-readable recording media include a flexible disk, hard disk, CD-ROM, MO, DVD, DVD-ROM, DVD-RAM, BD (Blu-ray Disc), and semiconductor memory. Still further, the present invention may be embodied as the digital signal per se stored on such a recording medium.

Still further, the present invention may be embodied as the computer program or digital signal that is transmitted via a telecommunication network, a wireless or wired communication network, a network typified by the Internet, or data broadcasting.

Still further, the present invention may be embodied as a computer system having a microprocessor and memory. The memory stores the computer program mentioned above and the microprocessor operates in accordance with the computer program.

Still further, the program or digital signal mentioned above may be transferred in form of a recording medium mentioned above or via a network mentioned above, so that the program or digital signal may be executed by another independent computer system.

(37) The present invention may be embodied as any combination of the above-described embodiments and modifications.

INDUSTRIAL APPLICABILITY

The tamper detection device according to the present invention is capable of tamper detection at high speed and with safety. Thus, the tamper detection device is highly usable as a computer, mobile phone or the like that executes a highly confidential information program involving authentication and/or handling of personal information.

The invention claimed is:

1. A tamper detection system for detecting tampering with a program, comprising:
   a first processing unit operable to generate in-process authentication data from a first program targeted for execution, by conducting a conversion process based on a parameter determined at random to shorten the first program;
   a first generating unit operable to generate, prior to execution of the first program, authentication information from the in-process authentication data by conducting a summarization process that is higher in computational complexity than the conversion process;
   a holding unit operable to hold the authentication information;
   a second processing unit operable to generate in-process comparative data from the first program by conducting the conversion process based on a parameter that is same as the parameter used by the first processing unit;
   a second generating unit operable to generate, during execution of a second program, comparative information from the in-process comparative data by conducting the summarization process; and
   a detection unit operable to detect, during execution of the second program, tampering with the first program, by using the authentication information and the comparative information,
   wherein the parameter indicates a data size,
   wherein the first and second processing units are each operable to convert the first program to be processed into data having the data size indicated by the parameter, and
   wherein the first and second processing units are each operable to conduct the conversion process by dividing the first program to be processed into a plurality of data blocks of the indicated data size and further conduct a digit-wise logical operation between the data blocks so that both the in-process authentication data and the in-process comparative data are generated to be equal in size to the indicated data size.

2. The tamper detection system according to claim 1, wherein
   the first program and the second program are identical, and
   the first conversion process is conducted, after the first program is loaded to a predetermined memory area, on a program residing in the predetermined memory area.

3. The tamper detection system according to claim 1, wherein the first and second processing units are each operable to conduct an exclusive OR operation as the digital-wise logical operation.

4. The tamper detection system according to claim 1, wherein
   the first generating unit includes cache memory and is operable to make, via the cache memory, an input/output access to memory storing the in-process authentication data, and the first processing unit is operable to conduct the conversion process, by using the parameter that indicates a data size equal to or smaller than a unit size of the cache memory for data read and write.

5. The tamper detection system according to claim 1, wherein
the first generating unit is operable to calculate, as the authentication information, a hash value of the in-process authentication data, and
the second generating unit is operable to calculate, as the comparative information, a hash value of the in-process comparative data.

6. The tamper detection system according to claim 5, wherein the first and second generating units are each operable to use a SHA1 operation to calculate the hash value.

7. The tamper detection system according to claim 1, wherein the first and second processing units are each operable to (i) judge whether the first program to be processed contains a relocation code, which is a code to be relocated upon loading of the first program, (ii) if a relocation code is contained, remove the relocation code from the first program, and (iii) convert a remaining part of the first program.

8. The tamper detection system according to claim 1, wherein the first and second processing units are each operable to (i) judge whether the first program to be processed contains a relocation code, which is a code to be relocated upon loading of the first program, (ii) if a relocation code is contained, replace the relocation code with a predetermined non-relocation code, and (iii) convert the first program whose relocation code has been replaced.

9. The tamper detection system according to claim 1, wherein
the first processing unit is operable to generate a random number as the parameter,
the second processing unit has the random number stored therein, and
the first and second processing units are each operable to add, prior to the conversion process, the random number to the first program to be processed.

10. The tamper detection system according to claim 1, wherein
the first generating unit is operable to generate a random number and calculate, as the authentication information, a hash value of the in-process authentication data by applying a hash function with the random number as a key, and
the second processing unit has the random number stored therein and is operable to calculate, as the comparative data, a hash value of the in-process comparative data by applying the hash function with the random number as the key.

11. The tamper detection system according to claim 1, wherein
the first processing unit is operable to generate a plurality of pieces of in-process authentication data of different sizes, by conducting the conversion process on the first program a plurality of number of times based on each of a plurality of parameters,
the first generating unit is operable to generate a plurality of pieces of authentication information by conducting the summarization process on the respective pieces of in-process authentication data, and
the tamper detection system further comprises a control unit operable to (i) select at least one of the plurality of pieces of authentication information, (ii) cause the second processing unit to generate, through the conversion process, the in-process comparative data that is equal in size to the at least one selected piece of authentication information, and (iii) cause the detection unit to detect tampering with the first program, by using the at least one selected piece of authentication information and the comparative information generated by the second generating unit.

12. The tamper detection system according to claim 11, wherein the control unit is operable to (i) calculate a process status value relating to an allocation of resources to processes being executed and (ii) select at least one of the plurality of pieces of authentication information based on the process status value.

13. The tamper detection system according to claim 12, wherein the control unit has stored therein a correspondence table showing one or more process status values in correspondence with the plurality of pieces of authentication information, and is operable to select one of the plurality of pieces of authentication information associated with the calculated process value with reference to the correspondence table.

14. The tamper detection system according to claim 1, wherein the first and second processing units are each operable to randomly specify a portion of the first program to be processed, extract the specified portion, and generate a corresponding one of the in-process authentication data and the in-process comparative data from the extracted portion.

15. The tamper detection system according to claim 14, wherein
the first processing unit is operable to randomly generate information indicating an extract-start position and an extract-end position, and
the first and second processing units are each operable to extract, from the first program to be processed, a portion staring at the extract-start position and ending at the extract-end position.

16. The tamper detection system according to claim 14, wherein
the first processing unit is operable to randomly generate information indicating an extract-start position and an extract-size, and
the first and second processing units are each operable to extract, from the first program to be processed, a portion starting at the extract-start position and is equal to the extract-size.

17. The tamper detection system according to claim 1, wherein the conversion process and the summarization process use mutually different one-way functions.

18. A method for detecting tampering with a program, the method comprising:
a first converting step of generating in-process authentication data from a first program targeted for execution, by conducting a conversion process based on a parameter determined at random to shorten the first program;
a first generating step of generating, prior to execution of the first program, authentication information from the in-process authentication data by conducting a summarization process that is higher in computational complexity than the conversion process;
a holding step of holding the authentication information;
a second converting step of generating in-process comparative data from the first program by conducting the conversion process based on a parameter that is same as the parameter used in the first processing step;
a second generating step of generating, during execution of a second program, comparative information from the in-process comparative data by conducting the summarization process; and a detecting step of detecting, during execution of the second program, tampering with the first program, by using the authentication information and the comparative information, wherein the parameter indicates a data size, wherein the first and second converting steps each convert the first program to be processed into data having the data size indicated by the parameter, and wherein the first and second converting steps each conduct the conversion process by dividing the first program to be processed into a plurality of data blocks of the indicated data size and further conduct a digit-wise logical operation between the data blocks so that both the in-process authentication data and the in-process comparative data are generated to be equal in size to the indicated data size.

19. A non-transitory computer-readable recording medium having a tamper detection program recorded thereon, the tamper detection program comprising code causing a computer to execute a method comprising:

a first converting step of generating in-process authentication data from a first program targeted for execution, by conducting a conversion process based on a parameter determined at random to shorten the first program;

a first generating step of generating, prior to execution of the first program, authentication information from the in-process authentication data by conducting a summarization process that is higher in computational complexity than the conversion process;

a holding step of holding the authentication information;

a second converting step of generating in-process comparative data from the first program by conducting the conversion process based on a parameter that is same as the parameter used in the first processing step;

a second generating step of generating, during execution of a second program, comparative information from the in-process comparative data by conducting the summarization process; and a detecting step of detecting, during execution of the second program, tampering with the first program, by using the authentication information and the comparative information, wherein the parameter indicates a data size, and wherein the first and second converting steps each convert the first program to be processed into data having the data size indicated by the parameter, and wherein the first and second converting steps each conduct the conversion process by dividing the first program to be processed into a plurality of data blocks of the indicated data size and further conduct a digit-wise logical operation between the data blocks so that both the in-process authentication data and the in-process comparative data are generated to be equal in size to the indicated data size.

20. An integrated circuit for detecting tampering with a program, the integrated circuit comprising:

a first processing unit operable to generate in-process authentication data from a first program targeted for execution, by conducting a conversion process based on a parameter determined at random to shorten the first program;

a first generating unit operable to generate, prior to execution of the first program, authentication information from the in-process authentication data by conducting a summarization process that is higher in computational complexity than the conversion process;

a holding unit operable to hold the authentication information;

a second processing unit operable to generate in-process comparative data from the first program by conducting the conversion process based on a parameter that is same as the parameter used by the first processing unit;

a second generating unit operable to generate, during execution of a second program, comparative information from the in-process comparative data by conducting the summarization process; and a detection unit operable to detect, during execution of the second program, tampering with the first program, by using the authentication information and the comparative information, wherein the parameter indicates a data size, wherein the first and second processing units are each operable to convert the first program to be processed into data having the data size indicated by the parameter, and wherein the first and second processing units are each operable to conduct the conversion process by dividing the first program to be processed into a plurality of data blocks of the indicated data size and further conduct a digit-wise logical operation between the data blocks so that both the in-process authentication data and the in-process comparative data are generated to be equal in size to the indicated data size.

21. The integrated circuit according to claim 20, wherein the integrated circuit is a Trusted Platform Module.

22. An authentication information generating device for generating authentication information to be used for detecting tampering with a program, the authentication information generating device comprising:

a processing unit operable to generate in-process authentication data from a program targeted for execution, by conducting a conversion process based on a parameter determined at random to shorten the target program;

a generating unit operable to generate, prior to execution of the target program, authentication information from the in-process authentication data by conducting a summarization process that is higher in computational complexity than the conversion process; and a supplying unit operable to supply the authentication information to a tamper detection device, wherein the parameter indicates a data size, wherein the processing unit is operable to convert the target program to be processed into data having the data size indicated by the parameter, and wherein the processing unit is operable to conduct the conversion process by dividing the target program to be processed into a plurality of data blocks of the indicated data size and further conduct a digit-wise logical operation between the data blocks so that both the in-process authentication data and in-process comparative data are generated to be equal in size to the indicated data size.

23. A tamper detection device for detecting tampering with a program, the tamper detection device comprising:

a holding unit operable to hold authentication information that is generated, prior to execution of a first program targeted for execution, from the first program by conducting a conversion process based on a random number to shorten the first program and further conducting a summarization process that is higher in computational complexity than the conversion process;

a processing unit operable to generate in-process comparative data from the first program by conducting the conversion process based on a parameter that is same as a parameter used by another processing unit;

a second generating unit operable to generate, during execution of a second program, comparative information from the in-process comparative data by conducting the summarization process; and a detection unit operable to detect, during execution of the second program, tampering with the first program, by using the authentication information and the comparative information, wherein the parameter indicates a data size, wherein the processing unit is operable to convert the first program to be processed into data having the data size indicated by the parameter, and wherein the processing unit is operable to conduct the conversion process by dividing the first program to be processed into a plurality of data blocks of the indicated data size and further conduct a digit-wise logical operation between the data blocks so that both in-process authentication data and the in-process comparative data are generated to be equal in size to the indicated data size.

* * * * *